(12) United States Patent
Perry

(10) Patent No.: US 10,808,667 B2
(45) Date of Patent: Oct. 20, 2020

(54) FUEL PUMP AND OUTLET VALVE THEREOF

(71) Applicant: DELPHI TECHNOLOGIES IP LIMITED, St. Michael (BB)

(72) Inventor: Robert B. Perry, Leicester, NY (US)

(73) Assignee: DELPHI TECHNOLOGIES IP LIMITED (BB)

( * ) Notice: Subject to any disclaimer, the term of this patent is extended or adjusted under 35 U.S.C. 154(b) by 5 days.

(21) Appl. No.: 16/143,855

(22) Filed: Sep. 27, 2018

(65) Prior Publication Data

US 2020/0102924 A1   Apr. 2, 2020

(51) Int. Cl.
| F02M 59/46 | (2006.01) |
| F02M 63/02 | (2006.01) |
| F04B 53/10 | (2006.01) |
| F16K 15/04 | (2006.01) |
| F16K 15/02 | (2006.01) |
| F02M 59/36 | (2006.01) |
| F02M 63/00 | (2006.01) |

(52) U.S. Cl.
CPC ........ *F02M 59/462* (2013.01); *F02M 59/464* (2013.01); *F02M 63/0245* (2013.01); *F02M 63/0265* (2013.01); *F04B 53/1002* (2013.01); *F16K 15/025* (2013.01); *F16K 15/026* (2013.01); *F16K 15/04* (2013.01); *F16K 15/044* (2013.01); *F16K 15/046* (2013.01); *F02M 59/367* (2013.01); *F02M 63/005* (2013.01); *F04B 53/10* (2013.01)

(58) Field of Classification Search
CPC .......................... F02M 59/462; F02M 59/464; F04B 53/1002; F04B 53/1007; F04B 53/101; F04B 53/1017; F16K 15/044; F16K 15/046
See application file for complete search history.

(56) References Cited

U.S. PATENT DOCUMENTS

| 3,894,556 A | * | 7/1975 | Pareja | ................... F16K 15/044 137/539 |
| 7,401,593 B2 | | 7/2008 | Rembold et al. | |
| 8,132,558 B2 | | 3/2012 | Lucas et al. | |

(Continued)

FOREIGN PATENT DOCUMENTS

| DE | 7225979 | * | 12/1973 | ........... F16K 15/044 |
| DE | 7225979 U | | 12/1973 | |

(Continued)

*Primary Examiner* — Kevin R Steckbauer
(74) *Attorney, Agent, or Firm* — Joshua M. Haines

(57) ABSTRACT

An outlet valve includes an outlet valve housing with an outlet valve bore including an outlet valve seating surface. The outlet valve also includes an outlet valve member which moves within the outlet valve bore second portion between a closed position and an open position. A surface of the outlet valve bore guides the outlet valve member during movement between the closed position and the open position. The surface of the outlet valve bore and the outlet valve seating surface are provided on a continuous piece of material of the outlet valve housing. An outlet valve spring biases the outlet valve member toward the closed position and a retainer is fixed to the outlet valve housing which grounds the outlet valve spring to the outlet valve housing.

16 Claims, 14 Drawing Sheets

(56) References Cited

U.S. PATENT DOCUMENTS

| | | | | |
|---|---|---|---|---|
| 8,397,749 B2* | 3/2013 | Neto | ................. | F01M 1/08 |
| | | | | 123/41.35 |
| 8,905,066 B2* | 12/2014 | Erb | ................. | F16K 17/0406 |
| | | | | 137/514.5 |
| 9,644,585 B2 | 5/2017 | Lucas | | |
| 9,828,959 B2* | 11/2017 | Teike | ................. | F02M 63/0054 |
| 2010/0001103 A1* | 1/2010 | Neto | ................. | F01P 3/08 |
| | | | | 239/583 |
| 2010/0116364 A1 | 5/2010 | Koyama | | |
| 2012/0285556 A1* | 11/2012 | Erb | ................. | F02M 37/0041 |
| | | | | 137/514.5 |
| 2016/0169174 A1* | 6/2016 | Teike | ................. | F02M 59/462 |
| | | | | 137/539 |
| 2019/0338720 A1* | 11/2019 | Banker | ................. | F02D 41/3094 |

FOREIGN PATENT DOCUMENTS

| | | | |
|---|---|---|---|
| EP | 3236061 A1 * | 10/2017 | ............. F04B 23/04 |
| EP | 3236061 A1 | 10/2017 | |
| GB | 2571933 A | 9/2019 | |
| JP | 2001099339 A | 4/2001 | |

\* cited by examiner

FUEL PUMP AND OUTLET VALVE THEREOF

TECHNICAL FIELD OF INVENTION

The present invention relates a fuel pump which supplies fuel to an internal combustion engine, and more particularly to such a fuel pump which includes an outlet valve.

BACKGROUND OF INVENTION

Fuel systems in modern internal combustion engines fueled by gasoline, particularly for use in the automotive market, employ gasoline direct injection (GDi) where fuel injectors are provided which inject fuel directly into combustion chambers of the internal combustion engine. In such systems employing GDi, fuel from a fuel tank is supplied under relatively low pressure by a low-pressure fuel pump which is typically an electric fuel pump located within the fuel tank. The low-pressure fuel pump supplies the fuel to a high-pressure fuel pump which typically includes a pumping plunger which is reciprocated by a camshaft of the internal combustion engine. Reciprocation of the pumping plunger further pressurizes the fuel in a pumping chamber of the high-pressure fuel pump in order to be supplied to fuel injectors which inject the fuel directly into the combustion chambers of the internal combustion engine. An outlet valve is typically included in an outlet passage of the high-pressure fuel pump where the outlet valve prevents flow of fuel back into the pumping chamber during an intake stroke of the pumping plunger. One known outlet valve is illustrated in FIG. 14 as outlet valve 400. Outlet valve 400 includes an outlet valve seat 402, an outlet valve member 404, an outlet valve member guide 406, and an outlet valve spring 408. Outlet valve seat 402 extends along an outlet valve axis 410 from an outlet valve seat first end 402a to an outlet valve seat second end 402b such that an outlet valve seat bore 412 extends therethrough from outlet valve seat first end 402a to outlet valve seat second end 402b. The end of outlet valve seat bore 412 which is proximal to outlet valve seat second end 402b includes an outlet valve seating surface 414 which is frustoconical in shape such that outlet valve member 404 seats on outlet valve seating surface 414 in order to prevent flow through outlet valve 400 and unseats from outlet valve seating surface 414 in order to permit flow through outlet valve 400. Outlet valve member guide 406 is a cup-shaped element which includes an outlet valve member guide end wall 406a which is perpendicular to outlet valve axis 410 and axially offset from outlet valve seat second end 402b. Outlet valve member guide 406 also includes an outlet valve member guide sidewall 406b which extends from outlet valve member guide end wall 406a, is annular in shape, and is centered about outlet valve axis 410. The end of outlet valve member guide sidewall 406b which is opposite from outlet valve member guide end wall 406a circumferentially surrounds outlet valve seat 402 and is fixed thereto by crimping outlet valve member guide sidewall 406b into an outlet valve seat groove 402c which is located on the outer periphery of outlet valve seat 402. A plurality of outlet valve member guide apertures 406c extend radially outward through outlet valve member guide sidewall 406b, thereby serving as outlets for outlet valve 400. Outlet valve member 404 is a spherical ball which is located within outlet valve member guide sidewall 406b and is captured axially between outlet valve seat second end 402b and outlet valve member guide end wall 406a. Outlet valve spring 408 is held in compression between outlet valve member 404 and outlet valve member guide end wall 406a, thereby biasing outlet valve member 404 toward outlet valve seating surface 414. In operation, a pumping stroke of the pumping plunger causes an increase in pressure within outlet valve seat bore 412, thereby urging outlet valve member 404 to the open position shown in phantom lines in FIG. 14. The open position of outlet valve member 404 allows fuel to flow from outlet valve seat bore 412 to outlet valve member guide apertures 406c for communication to the fuel injectors. Conversely, an intake stroke of the pumping plunger causes a decrease in pressure within outlet valve seat bore 412, thereby causing outlet valve spring 408 to urge outlet valve member 404 to the closed position shown in solid lines in FIG. 14 where outlet valve member 404 seats with outlet valve seating surface 414, thereby preventing backflow of fuel to the pumping chamber. Outlet valve member 404 is guided during opening and closing by the inner periphery of outlet valve member guide sidewall 406b, i.e. the inner periphery of outlet valve member guide sidewall 406b limits lateral movement of outlet valve member 404 relative to outlet valve axis 410. However, since outlet valve seating surface 414 is formed on a separate component from the inner periphery of outlet valve member guide sidewall 406b, the diametric clearance between outlet valve member 404 and outlet valve member guide sidewall 406b must be sufficiently large to accommodate manufacturing variations while ensuring that outlet valve member 404 seats with outlet valve seating surface 414. Consequently, the diametric clearance between outlet valve member 404 and outlet valve member guide sidewall 406b is in excess of 200 microns which allows outlet valve member 404 to move laterally sufficiently far so as to cause outlet valve member 404 to be uncentered with outlet valve seating surface 414 when outlet valve member 404 first makes contact therewith when moving to the closed position. Outlet valve member 404 must then rattle into position to fully seat with outlet valve member 404 which causes noise and may reduce durability. Additionally, since outlet valve member guide sidewall 406b is formed on a separate component from outlet valve seating surface 414, outlet valve member guide apertures 406c are axially offset from outlet valve seat second end 402b, thereby causing turbulence as the fuel passes to outlet valve member guide apertures 406c which may create noise and restriction to flow.

What is needed is a fuel pump and outlet valve which minimize or eliminate one or more of the shortcomings as set forth above and provide an alternative to the fuel systems as set forth above.

SUMMARY OF THE INVENTION

Briefly described, an outlet valve is provided by the present invention for controlling outlet fuel flow of a fuel pump. The outlet valve includes an outlet valve housing extending from a first end to a second end along an outlet valve axis, the outlet valve housing having an outlet valve bore having an outlet valve bore first portion which extends toward the second end and the outlet valve bore also having an outlet valve bore second portion which extends from the second end to the outlet valve bore first portion such that an outlet valve seating surface is located within the outlet valve bore. The outlet valve also includes an outlet valve member which moves within the outlet valve bore second portion between 1) a closed position in which the outlet valve member is seated with the outlet valve seating surface which prevents fluid communication from the outlet valve bore first portion to the outlet valve bore second portion and 2) an open position in which the outlet valve member is unseated with the outlet valve seating surface which permits fluid communication from the outlet valve bore first portion to the outlet valve bore second portion, wherein a surface of the outlet valve bore second portion guides the outlet valve member during movement between the closed position and the open position and wherein the surface of the outlet valve bore second portion and the outlet valve seating surface are provided on a continuous piece of material of the outlet valve housing. The outlet valve also includes an outlet valve spring which biases the outlet valve member toward the closed position. The outlet valve also includes a retainer fixed to the outlet valve housing which grounds the outlet valve spring to the outlet valve housing. A fuel pump which includes the aforementioned outlet valve is also provided by the present invention. The outlet valve and fuel pump including the outlet valve of the present invention provides reduced noised and increased durability.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

Figure 1:
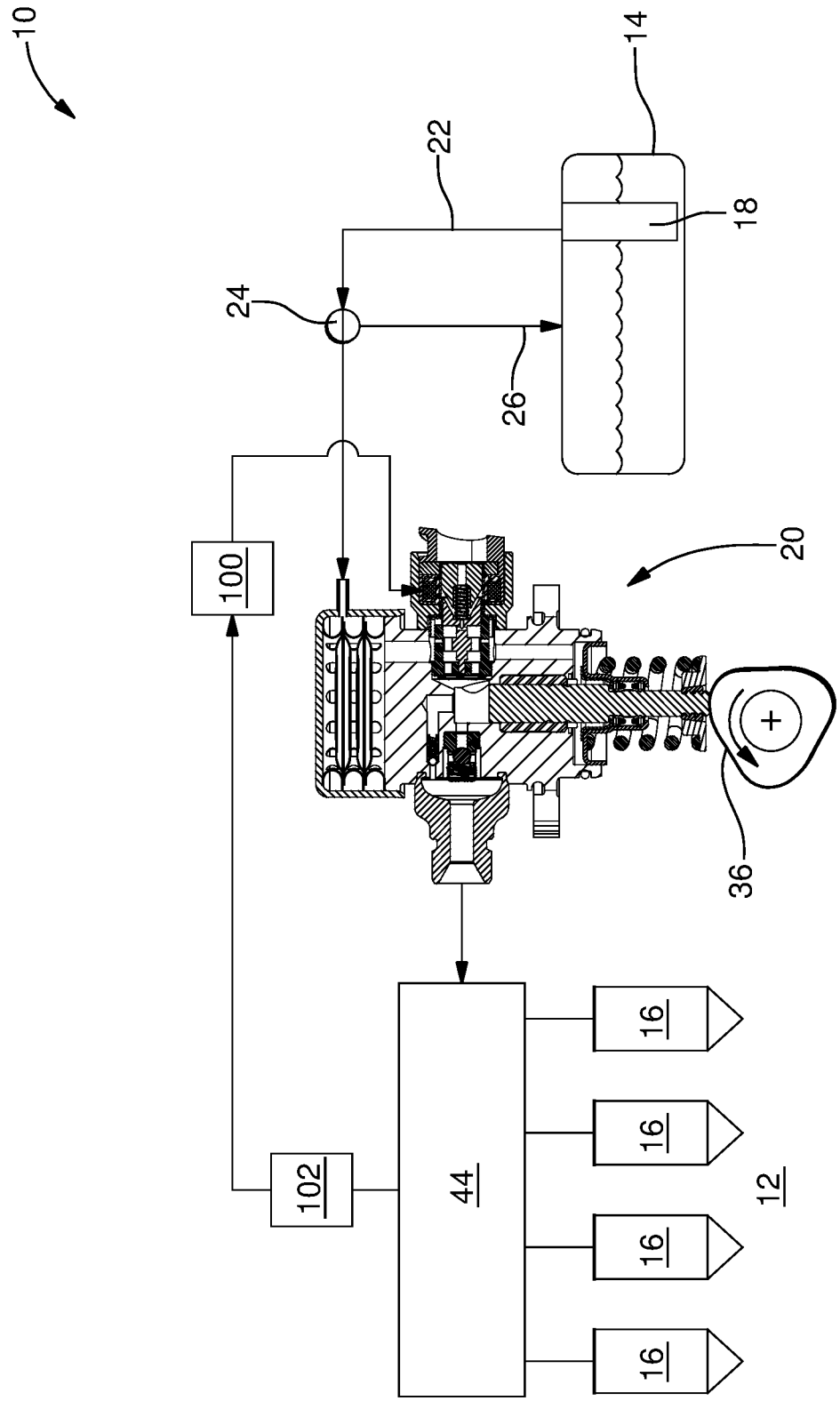
FIG. 1 is a schematic view of a fuel system including a fuel pump in accordance with the present invention.

In accordance with a preferred embodiment of this invention and referring initially to FIG. 1, a fuel system 10 for an internal combustion engine 12 is shown is schematic form. Fuel system 10 generally includes a fuel tank 14 which holds a volume of fuel to be supplied to internal combustion engine 12 for operation thereof; a plurality of fuel injectors 16 which inject fuel directly into respective combustion chambers (not shown) of internal combustion engine 12; a low-pressure fuel pump 18; and a high-pressure fuel pump 20 where the low-pressure fuel pump 18 draws fuel from fuel tank 14 and elevates the pressure of the fuel for delivery to high-pressure fuel pump 20 where the high-pressure fuel pump 20 further elevates the pressure of the fuel for delivery to fuel injectors 16. By way of non-limiting example only, low-pressure fuel pump 18 may elevate the pressure of the fuel to about 500 kPa or less and high-pressure fuel pump 20 may elevate the pressure of the fuel to above about 14 MPa. While four fuel injectors 16 have been illustrated, it should be understood that a lesser or greater number of fuel injectors 16 may be provided.

As shown, low-pressure fuel pump 18 may be provided within fuel tank 14, however low-pressure fuel pump 18 may alternatively be provided outside of fuel tank 14. Low-pressure fuel pump 18 may be an electric fuel pump as are well known to a practitioner of ordinary skill in the art. A low-pressure fuel supply passage 22 provides fluid communication from low-pressure fuel pump 18 to high-pressure fuel pump 20. A fuel pressure regulator 24 may be provided such that fuel pressure regulator 24 maintains a substantially uniform pressure within low-pressure fuel supply passage 22 by returning a portion of the fuel supplied by low-pressure fuel pump 18 to fuel tank 14 through a fuel return passage 26. While fuel pressure regulator 24 has been illustrated in low-pressure fuel supply passage 22 outside of fuel tank 14, it should be understood that fuel pressure regulator 24 may be located within fuel tank 14 and may be integrated with low-pressure fuel pump 18.

Figure 2:
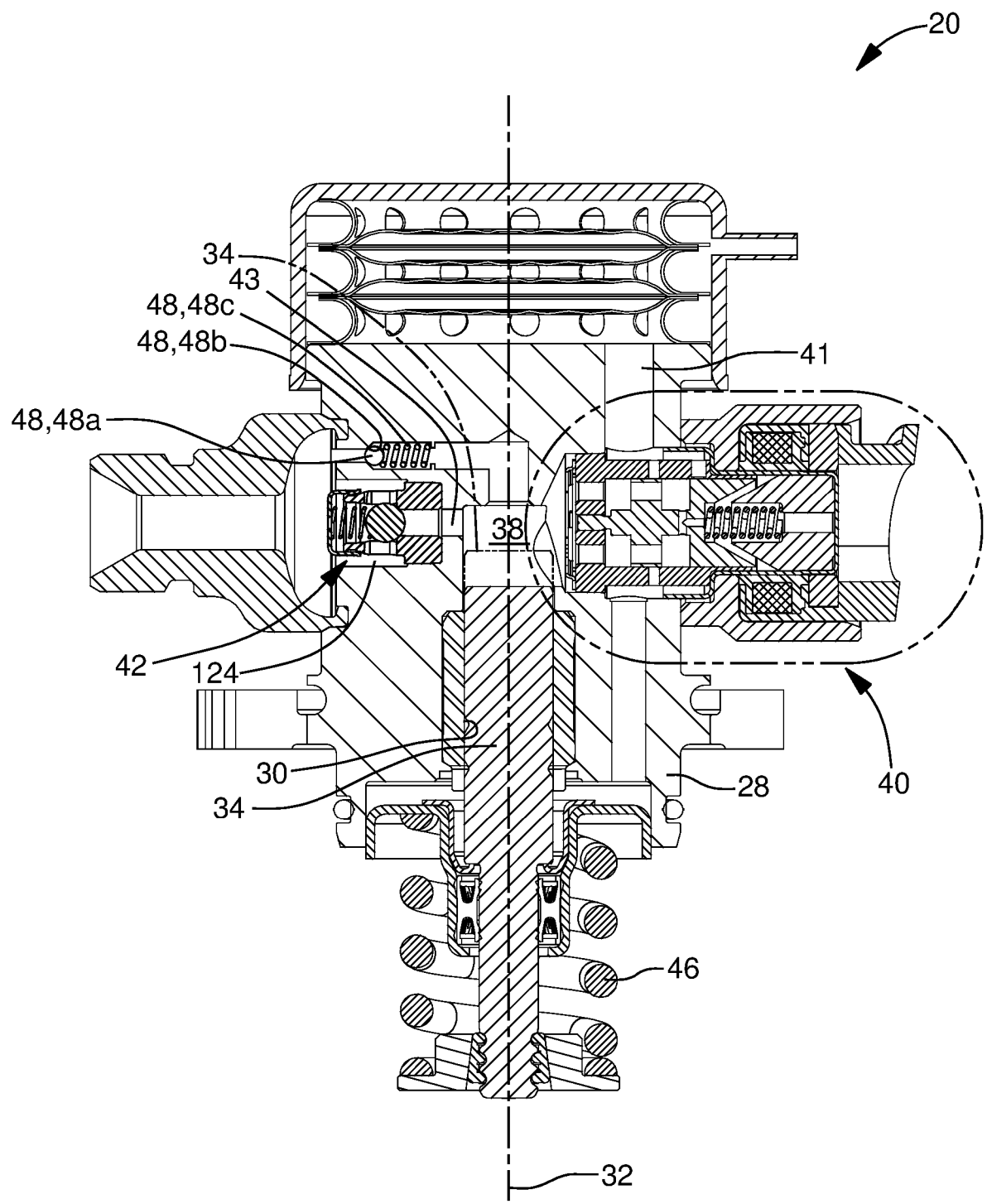
FIG. 2 is a cross-sectional view of the fuel pump of FIG. 1.
Figure 3:
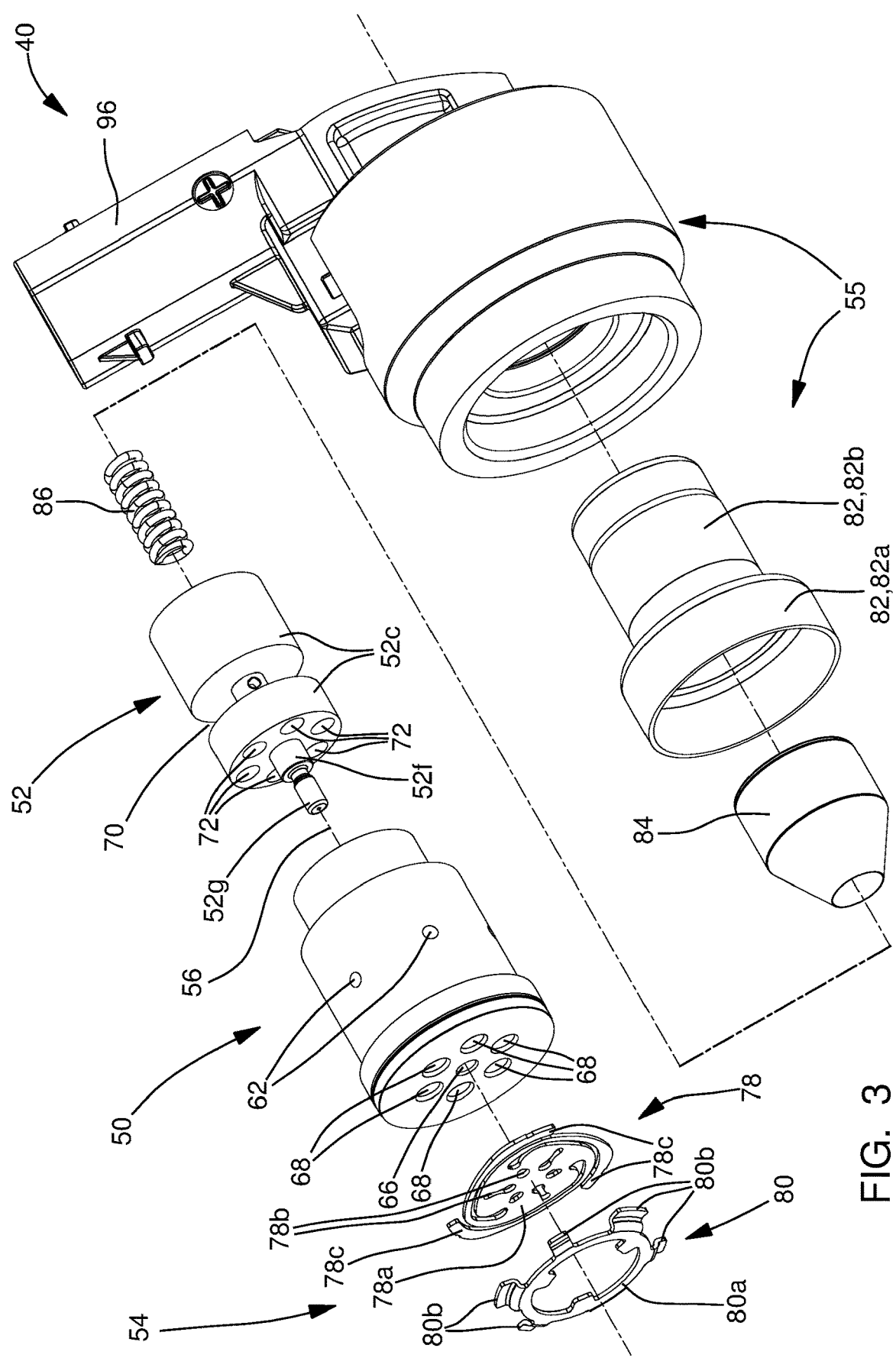
FIG. 3 is an exploded isometric view of an inlet valve assembly of the fuel pump of FIGS. 1 and 2.

Now with additional reference to FIG. 2, high-pressure fuel pump 20 includes a fuel pump housing 28 which includes a plunger bore 30 which extends along, and is centered about, a plunger bore axis 32. As shown, plunger bore 30 may be defined by a combination of an insert and directly by fuel pump housing 28. High-pressure fuel pump 20 also includes a pumping plunger 34 which is located within plunger bore 30 and reciprocates within plunger bore 30 along plunger bore axis 32 based on input from a rotating camshaft 36 of internal combustion engine 12 (shown only in FIG. 1). A pumping chamber 38 is defined within fuel pump housing 28, and more specifically, pumping chamber 38 is defined by plunger bore 30 and pumping plunger 34. An inlet valve assembly 40 of high-pressure fuel pump 20 is located within a pump housing inlet passage 41 of fuel pump housing 28 and selectively allows fuel from low-pressure fuel pump 18 to enter pumping chamber 38 while an outlet valve 42 is located within an outlet passage 43 of fuel pump housing 28 and selectively allows fuel to be communicated from pumping chamber 38 to fuel injectors 16 via a fuel rail 44 to which each fuel injector 16 is in fluid communication. In operation, reciprocation of pumping plunger 34 causes the volume of pumping chamber 38 to increase during an intake stroke of pumping plunger 34 (downward as oriented in FIG. 2) in which a plunger return spring 46 causes pumping plunger 34 to move downward, and conversely, the volume of pumping chamber 38 decrease during a compression stroke (upward as oriented in FIG. 2) in which camshaft 36 causes pumping plunger 34 to move upward against the force of plunger return spring 46. In this way, fuel is selectively drawn into pumping chamber 38 during the intake stroke, depending on operation of inlet valve assembly 40 as will be described in greater detail later, and conversely, fuel is pressurized within pumping chamber 38 by pumping plunger 34 during the compression stroke and discharged through outlet valve 42, as will be described in greater detail later, under pressure to fuel rail 44 and fuel injectors 16. It should be noted that outlet valve 42 is a one-way valve which allows fuel to flow from pumping chamber 38 toward fuel rail 44, but prevents flow in the opposite direction. For clarity, pumping plunger 34 is shown in solid lines in FIG. 2 to represent the intake stroke and pumping plunger 34 is shown in phantom lines in FIG. 2 to represent the compression stroke. High-pressure fuel pump 20 also includes a pressure relief valve assembly 48 which is arranged downstream of outlet valve 42 in order to provide a fluid path back to pumping chamber 38 if the pressure downstream of outlet valve 42 reaches a predetermined limit which may pose an unsafe operating condition if left unmitigated.

Pressure relief valve assembly 48 generally includes a pressure relief valve member 48a, a pressure relief valve seat 48b, and a pressure relief valve spring 48c. Pressure relief valve member 48a, illustrated by way of non-limiting example only as a ball, is biased toward pressure relief valve seat 48b by pressure relief valve spring 48c where pressure relief valve spring 48c is selected to allow pressure relief valve member 48a to unseat from pressure relief valve seat 48b when a predetermined presser differential between pumping chamber 38 and fuel rail 44 is achieved. Pressure relief valve assembly 48 is oriented such that fuel is allowed to flow into of pumping chamber 38 through pressure relief valve assembly 48, however, fuel is not allowed to flow out of pumping chamber 38 through pressure relief valve assembly 48.

Inlet valve assembly 40 will now be described with particular reference to FIGS. 3-7. Inlet valve assembly 40 includes a valve body 50, a valve spool 52 located within valve body 50, a check valve 54, and a solenoid assembly 55. The various elements of inlet valve assembly 40 will be described in greater detail in the paragraphs that follow.

Valve body 50 is centered about, and extends along, a valve body axis 56 such that valve body 50 extends from a valve body first end 50a to a valve body second end 50b. A valve body bore 58 extends into valve body 50 from valve body first end 50a and terminates at a valve body end wall 60 which extends to valve body second end 50b such that valve body bore 58 is preferably cylindrical. A valve body first inlet passage 62 extends through valve body 50 such that valve body first inlet passage 62 extends from a valve body outer periphery 50c of valve body 50 and opens into valve body bore 58. A valve body second inlet passage 64 (not visible in FIG. 3, but visible in FIGS. 4-7) extends through valve body 50 such that valve body second inlet passage 64 extends from valve body outer periphery 50c and opens into valve body bore 58. As shown in the figures, valve body first inlet passage 62 and valve body second inlet passage 64 are spaced axially apart from each other along valve body axis 56 such that valve body second inlet passage 64 is located axially between valve body first end 50a and valve body first inlet passage 62. Also as shown in the figures, a plurality of valve body first inlet passages 62 may be provided such that each valve body first inlet passage 62 is located in the same axial location along valve body axis 56, however, each valve body first inlet passage 62 is spaced apart from the other valve body first inlet passages 62 around valve body outer periphery 50c. While only one valve body second inlet passage 64 is illustrated, it should be understood that a plurality of valve body second inlet passages 64 may be provided at the same axial location along valve body axis 56 but spaced apart from each other around valve body outer periphery 50c.

A valve body central passage 66 extends through valve body end wall 60 such that valve body central passage 66 connects valve body second end 50b with valve body bore 58 and such that valve body central passage 66 is centered about, and extends along, valve body axis 56. A plurality of valve body outlet passages 68 is provided in valve body end wall 60 such that each valve body outlet passage 68 extends through valve body end wall 60 and such that each valve body outlet passage 68 connects valve body second end 50b with valve body bore 58. Each valve body outlet passage 68 is laterally offset from valve body central passage 66 and extends through valve body end wall 60 in a direction parallel to valve body axis 56.

As shown in the figures, valve body outer periphery 50c may include three sections of distinct diameters. A valve body outer periphery first portion 50d of valve body outer periphery 50c begins at valve body first end 50a and extends to a valve body outer periphery second portion 50e of valve body outer periphery 50c such that valve body outer periphery first portion 50d is smaller in diameter than valve body outer periphery second portion 50e. As shown in the figures, valve body outer periphery first portion 50d may be located entirely outside of pump housing inlet passage 41 and valve body outer periphery second portion 50e includes valve body first inlet passage 62 and valve body second inlet passage 64 such that valve body first inlet passage 62 and valve body second inlet passage 64 are each in constant fluid communication with the portion of pump housing inlet passage 41 that is upstream of inlet valve assembly 40, i.e. valve body first inlet passage 62 and valve body second inlet passage 64 are each in constant fluid communication with the portion of pump housing inlet passage 41 that is between inlet valve assembly 40 and low-pressure fuel pump 18. A valve body outer periphery third portion 50f of valve body outer periphery 50c extends from valve body outer periphery second portion 50e to valve body second end 50b such that valve body outer periphery third portion 50f is larger in diameter than valve body outer periphery second portion 50e. Valve body outer periphery third portion 50f is sealingly engaged with pump housing inlet passage 41 such that fluid communication through pump housing inlet passage 41 past inlet valve assembly 40 at the interface of pump housing inlet passage 41 and valve body outer periphery third portion 50f is prevented and fluid communication through pump housing inlet passage 41 past inlet valve assembly 40 is only possible through valve body bore 58.

Valve spool 52 is made of a magnetic material and is centered about, and extends along, valve body axis 56 from a valve spool first end 52a to a valve spool second end 52b. Valve spool 52 includes a valve spool first portion 52c which is proximal to valve spool first end 52a and a valve spool second portion 52d which is proximal to valve spool second end 52b. Valve spool first portion 52c has a valve spool outer periphery 52e which is complementary with valve body bore 58 such that valve spool outer periphery 52e and valve body bore 58 are sized in order to substantially prevent fuel from passing between the interface of valve spool outer periphery 52e and valve body bore 58. As used herein, substantially preventing fuel from passing between the interface of valve spool outer periphery 52e and valve body bore 58 encompasses permitting small amounts of fuel passing between the interface which still allows operation of high-pressure fuel pump 20 as will readily be recognized by a practitioner of ordinary skill in the art. Valve spool second portion 52d includes a base portion 52f which extends from valve spool first portion 52c such that base portion 52f is smaller in diameter than valve spool first portion 52c, thereby providing an annular space radially between base portion 52f and valve body bore 58. Valve spool second portion 52d also include a tip portion 52g which extend from base portion 52f and terminates at valve spool second end 52b. Tip portion 52g is smaller in diameter than base portion 52f, thereby defining a valve spool shoulder 52h where tip portion 52g meets base portion 52f. Tip portion 52g is sized to be located within valve body central passage 66 of valve body 50 such that tip portion 52g is able to slide freely within valve body central passage 66 in the direction of valve body axis 56. In use, tip portion 52g is used to interface with check valve 54 as will be described in greater detail later.

Valve spool first portion 52c is provided with a valve spool groove 70 which extends radially inward from valve spool outer periphery 52e such that valve spool groove 70 is annular in shape. Valve spool groove 70 is selectively aligned or not aligned with valve body first inlet passage 62 and valve body second inlet passage 64 in order to control fluid communication through pump housing inlet passage 41 as will be described in greater detail later. One or more valve spool passages 72 is provided which extend from valve spool groove 70 through valve spool first portion 52c toward valve spool second end 52b, thereby providing fluid communication between valve spool groove 70 and valve body outlet passages 68.

A valve spool end bore 74 extends into valve spool 52 from valve spool first end 52a. As shown, valve spool end bore 74 may include a valve spool end bore first portion 74a which is an internal frustoconical shape and a valve spool end bore second portion 74b which is cylindrical and terminates with a valve spool end bore bottom 74c. A valve spool connecting passage 76 provides fluid communication between valve spool groove 70 and valve spool end bore 74 such that, as shown in the figures, valve spool connecting passage 76 may be formed, by way of non-limiting example only, by a pair of perpendicular drillings.

Check valve 54 includes a check valve member 78 and a travel limiter 80. Check valve 54 is arranged at valve spool second end 52b such that check valve member 78 is moved between a seated position which blocks valve body outlet passages 68 (shown in FIGS. 5-7) and an open position which unblocks valve body outlet passages 68 (shown in FIG. 4) as will be described in greater detail later. Check valve member 78 includes a check valve central portion 78a which is a flat plate with check valve passages 78b extending therethrough where it is noted that only select check valve passages 78b have been labeled in FIG. 3 for clarity. Check valve passages 78b are arranged through check valve central portion 78a such that check valve passages 78b are not axially aligned with valve body outlet passages 68. A plurality of check valve legs 78c extend from check valve central portion 78a such that check valve legs 78c are resilient and compliant. Free ends of check valve legs 78c are fixed to valve body second end 50b, for example, by welding. Consequently, when the pressure differential between valve body bore 58 and pumping chamber 38 is sufficiently high, check valve central portion 78a is allowed to unseat from valve spool 52 due to elastic deformation of check valve legs 78c, thereby opening valve body outlet passages 68. Travel limiter 80 includes a travel limiter ring 80a which is axially spaced apart from valve body second end 50b to provide the allowable amount of displacement of check valve member 78. Travel limiter 80 also includes a plurality of travel limiter legs 80b which provides the axial spacing between travel limiter ring 80a and valve body second end 50b. Travel limiter legs 80b are integrally formed with travel limiter ring 80a and are fixed to valve body second end 50b, for example by welding.

Solenoid assembly 55 includes an inner housing 82, a pole piece 84 located within inner housing 82, a return spring 86, a spool 88, a coil 90, an overmold 92, and an outer housing 94. The various elements of solenoid assembly 55 will be described in greater detail in the paragraphs that follow.

Inner housing 82 is hollow and is stepped both internally and externally such that an inner housing first portion 82a is open and larger in diameter than an inner housing second portion 82b which is closed. Inner housing 82 is centered about, and extends along valve body axis 56. The outer periphery of inner housing first portion 82a sealingly engages fuel pump housing 28 in order to prevent leakage of fuel from pump housing inlet passage 41 to the exterior of high-pressure fuel pump 20 and an annular gap is provided between the inner periphery of inner housing first portion 82a and valve body outer periphery second portion 50e in order to provide fluid communication between pump housing inlet passage 41 and valve body second inlet passage 64. The inner periphery of inner housing second portion 82b mates with valve body outer periphery first portion 50d to prevent communication of fuel between the interface of the inner periphery of inner housing second portion 82b and valve body outer periphery first portion 50d.

Pole piece 84 is made of a magnetically permeable material and is received within inner housing second portion 82b such that pole piece 84 is centered about, and extends along, valve body axis 56. A pole piece first end 84a is frustoconical such that the angle of pole piece first end 84a is complementary to the angle of valve spool end bore first portion 74a. In this way, pole piece first end 84a is received within valve spool end bore first portion 74a. A pole piece second end 84b, which is opposed to pole piece first end 84a, is located at the closed end of inner housing 82. A pole piece bore 84c extends axially through pole piece 84 from pole piece first end 84a to pole piece second end 84b such that the larger diameter portion of pole piece bore 84c extends into pole piece 84 from pole piece first end 84a, thereby defining a pole piece shoulder 84d which faces toward valve spool end bore bottom 74c. Return spring 86 is received partially with pole piece bore 84c such that return spring 86 abuts pole piece shoulder 84d. Return spring 86 is also partially received within valve spool end bore second portion 74b and abuts valve spool end bore bottom 74c. Return spring 86 is held in compression between pole piece shoulder 84d and valve spool end bore bottom 74c, and in this way, return spring 86 biases valve spool 52 away from pole piece 84.

Spool 88 is made of an electrically insulative material, for example plastic, and is centered about, and extends along, valve body axis 56 such that spool 88 circumferentially surrounds inner housing second portion 82b in a close-fitting relationship. Coil 90 is a winding of electrically conductive wire which is wound about the outer periphery of spool 88 such that coil 90 circumferentially surrounds pole piece 84. Consequently, when coil 90 is energized with an electric current, valve spool 52 is magnetically attracted to, and moved toward, pole piece 84 and when coil 90 is not energized with an electric current, valve spool 52 is moved away from pole piece 84 by return spring 86. A more detailed description of operation will be provided later.

Outer housing 94 circumferentially surrounds inner housing 82, spool 88, and coil 90 such that spool 88 and coil 90 are located radially between inner housing 82 and outer housing 94. Overmold 92 is an electrically insulative material, for example plastic, which fills the void between spool 88/coil 90 and outer housing 94 such that overmold 92 extends axially from outer housing 94 to define an electrical connector 96 which includes terminals (not shown) that are connected to opposite ends of coil 90. Electrical connector 96 is configured to mate with a complementary electrical connector (not show) for supplying electric current to coil 90 in use. As shown, a coil washer 98 may be provided within outer housing 94 axially between coil 90 and overmold 92 in order to complete the magnetic circuit of solenoid assembly 55.

Figure 4:
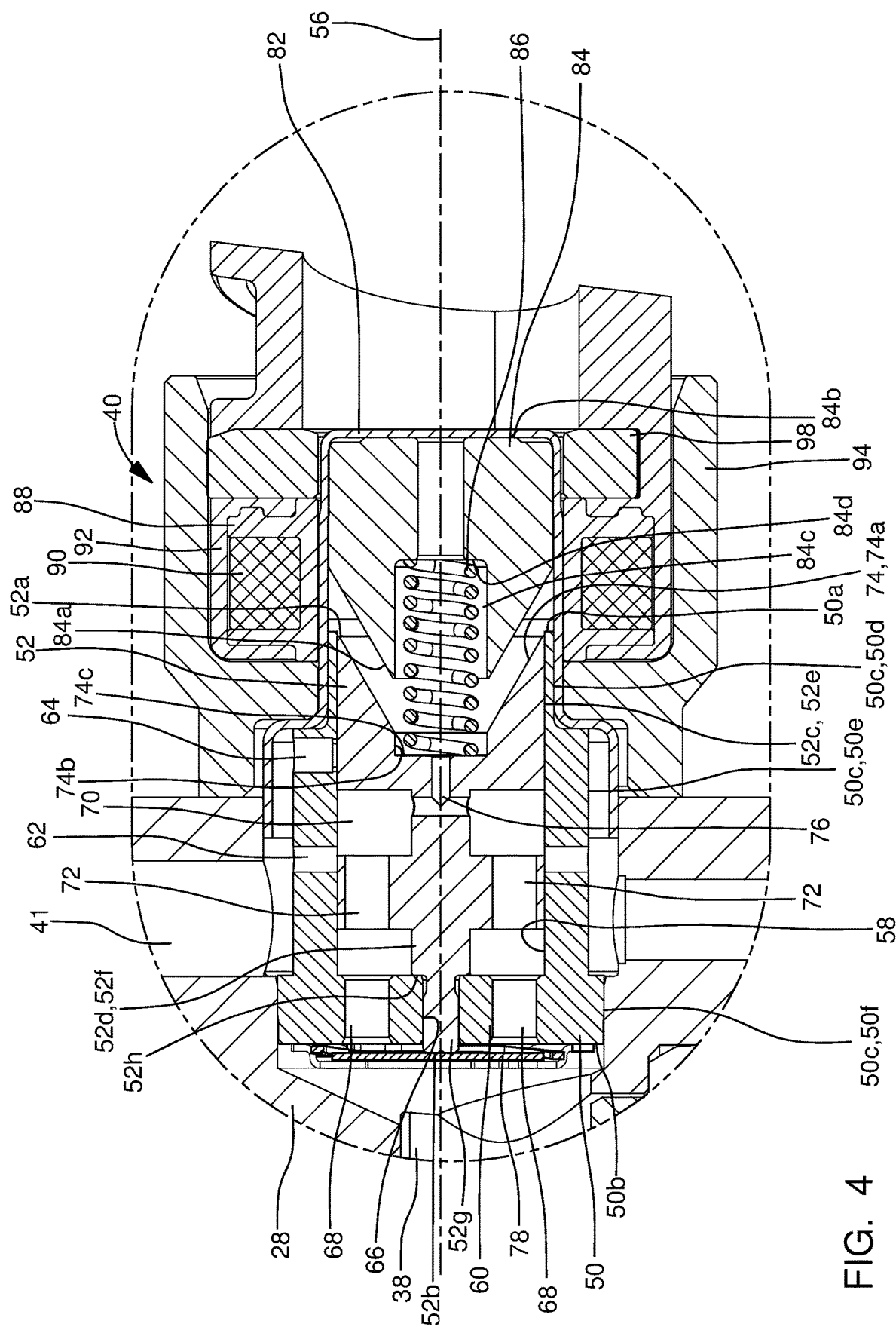
FIG. 4 is an enlargement of a portion of FIG. 2 showing the inlet valve assembly of the fuel pump in a first position.

Operation of high-pressure fuel pump 20, and in particular, inlet valve assembly 40, will now be described with particular reference to FIG. 4 which shows valve spool 52 in a first position which results from no electric current being supplied to coil 90 of solenoid assembly 55. When no electric current is supplied to coil 90, return spring 86 urges valve spool 52 away from pole piece 84 until valve spool shoulder 52h abuts valve body end wall 60 which allows tip portion 52g of valve spool 52 to protrude beyond valve body second end 50b such that tip portion 52g holds check valve member 78 in an unseated position which permits flow through valve body outlet passages 68 and such that valve body outlet passages 68 are in fluid communication with pumping chamber 38. Also in the first position, valve spool groove 70 is aligned with valve body first inlet passage 62, however, it is noted that valve spool groove 70 is not aligned with valve body second inlet passage 64. In this way, valve spool 52 maintains check valve member 78 in the unseated position and valve body first inlet passage 62 is in fluid communication with valve body outlet passages 68. It should be noted that in the first position, alignment between valve spool groove 70 and valve body first inlet passage 62 provides a path to pump housing inlet passage 41. In this way, the first position is a default position that provides limp-home operation of high-pressure fuel pump 20, that is, if electrical power to solenoid assembly 55 is unintentionally interrupted, fuel in sufficient quantity and pressure is supplied to fuel injectors 16 by low-pressure fuel pump 18 for continued operation of internal combustion engine 12, although without the fuel being pressurized by high-pressure fuel pump 20 since check valve member 78 being held in the unseated position by valve spool 52 prevents pressurization of fuel by pumping plunger 34. It should be noted that the path to pump housing inlet passage 41 which enables the limp-home operation of high-pressure fuel pump 20 also enables the use of only one pressure-relief valve, i.e. pressure relief valve assembly 48.

Figure 5:
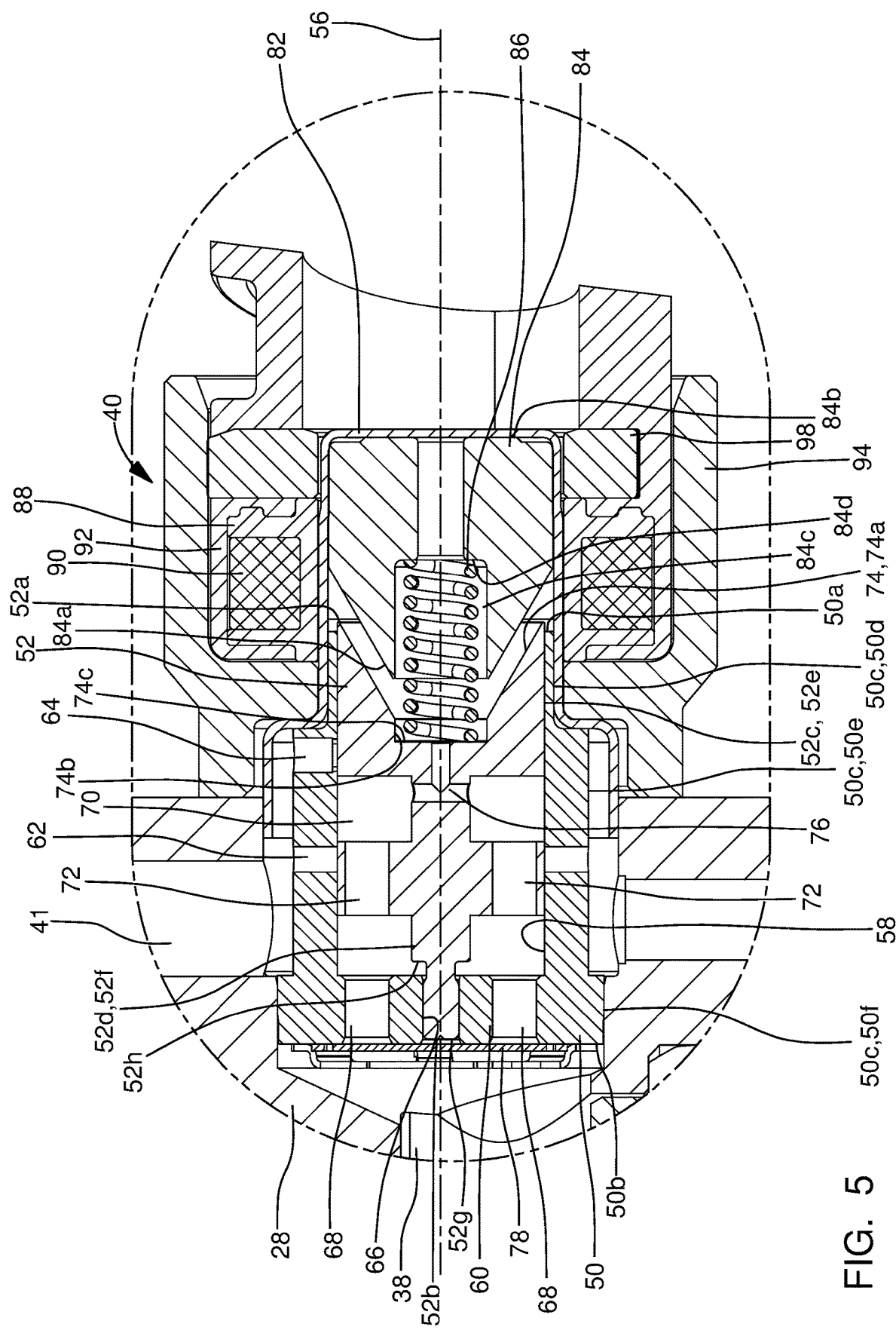
FIG. 5 is the view of FIG. 4, now showing the inlet valve assembly in a second position.

Now with particular reference to FIG. 5, valve spool 52 is shown in a second position which results from electric current being supplied to coil 90 of solenoid assembly 55 at a first duty cycle. When electric current is supplied to coil 90 at the first duty cycle, valve spool 52 is attracted to pole piece 84, thereby moving valve spool 52 toward pole piece 84 and compressing return spring 86 to a greater extent than in the first position. Valve spool connecting passage 76 allows fuel located between valve spool 52 and pole piece 84 to be displaced toward valve body outlet passages 68 during movement of valve spool 52 toward pole piece 84 and also allows pressure to equalize on each axial end of valve spool 52. In the second position, tip portion 52g is positioned to no longer protrude beyond valve body second end 50b, and consequently, check valve member 78 is moved to a seated position which prevents flow into valve body bore 58 through valve body outlet passages 68. Also in the second position, valve spool groove 70 is not aligned with valve body first inlet passage 62 and is also not aligned with valve body second inlet passage 64, and in this way, fuel is prevented from entering or exiting valve body bore 58 through valve body first inlet passage 62 and valve body second inlet passage 64. Consequently, valve body first inlet passage 62 and valve body second inlet passage 64 is not in fluid communication with valve body outlet passages 68. The second position of valve spool 52 is used when internal combustion engine 12 is in operation but is not requesting fuel to be supplied from fuel injectors 16 as may occur during a fuel deceleration cutoff event when an automobile is coasting and no fuel is being commanded. In this way, the second position prevents fuel from being supplied to fuel injectors 16.

Figure 6:
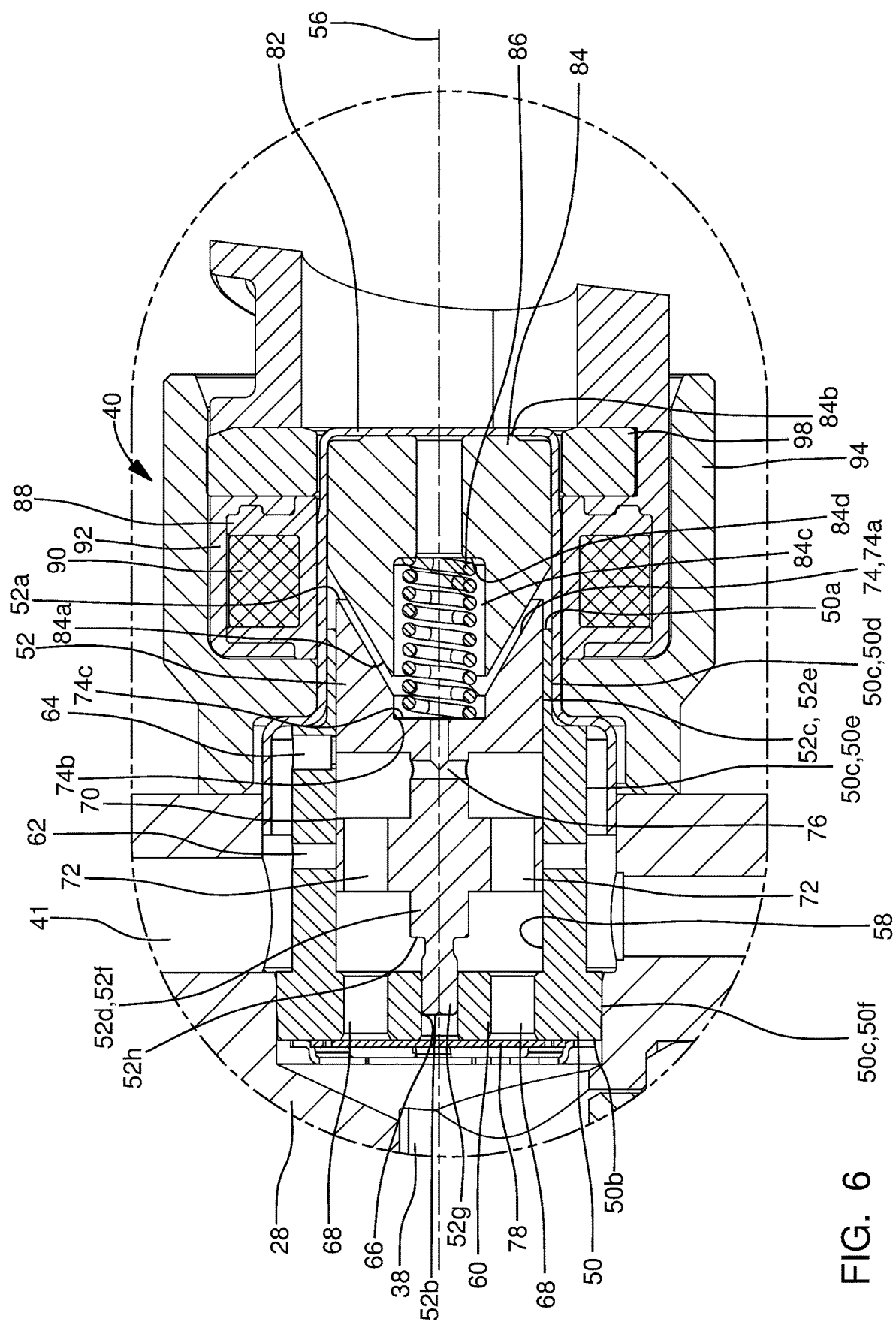
FIG. 6 is the view of FIGS. 4 and 5, now showing the inlet valve assembly in a third position.

Now with particular reference to FIG. 6, valve spool 52 is shown in a third position which results from electric current being supplied to coil 90 of solenoid assembly 55 at a second duty cycle which is greater than the first duty cycle used to achieve the second position of valve spool 52. When electric current is supplied to coil 90 at the second duty cycle, valve spool 52 is attracted to pole piece 84, thereby moving valve spool 52 toward pole piece 84 and compressing return spring 86 to a greater extent than in the second position. Just as in the second position, the third position results in tip portion 52g being positioned to no longer protrude beyond valve body second end 50b, and consequently, check valve member 78 is moved to a seated position which prevents flow into valve body bore 58 through valve body outlet passages 68. However, it should be noted that check valve member 78 is able to move to the unseated position when the pressure differential between valve body bore 58 and pumping chamber 38 is sufficiently high, i.e. during the intake stroke. Also in the third position, valve spool groove 70 is not aligned with valve body first inlet passage 62, however, valve spool groove 70 is now aligned with valve body second inlet passage 64, and in this way, fuel is allowed to valve body bore 58 through valve body second inlet passage 64. Consequently, during the intake stroke of pumping plunger 34, a pressure differential is created which allows fuel to flow through inlet valve assembly 40 through valve body second inlet passage 64, thereby moving check valve member 78 to the unseated position which allows fuel to flow into pumping chamber 38. During the compression stroke of pumping plunger 34, pressure increases within pumping chamber 38, thereby causing check valve member 78 to move to the seated position which prevents fuel from flowing from pumping chamber 38 into valve body bore 58 and which allows the pressurized fuel within pumping chamber 38 to be discharged through outlet valve 42. The third position of valve spool 52 is used when internal combustion engine 12 is required to produce a light output torque since it is noted that alignment of valve spool groove 70 with valve body second inlet passage 64 provides a restricted passage which thereby meters a small amount of fuel to pumping chamber 38 during the intake stroke of pumping plunger 34 to support fueling of internal combustion engine 12 at light loads.

Figure 7:
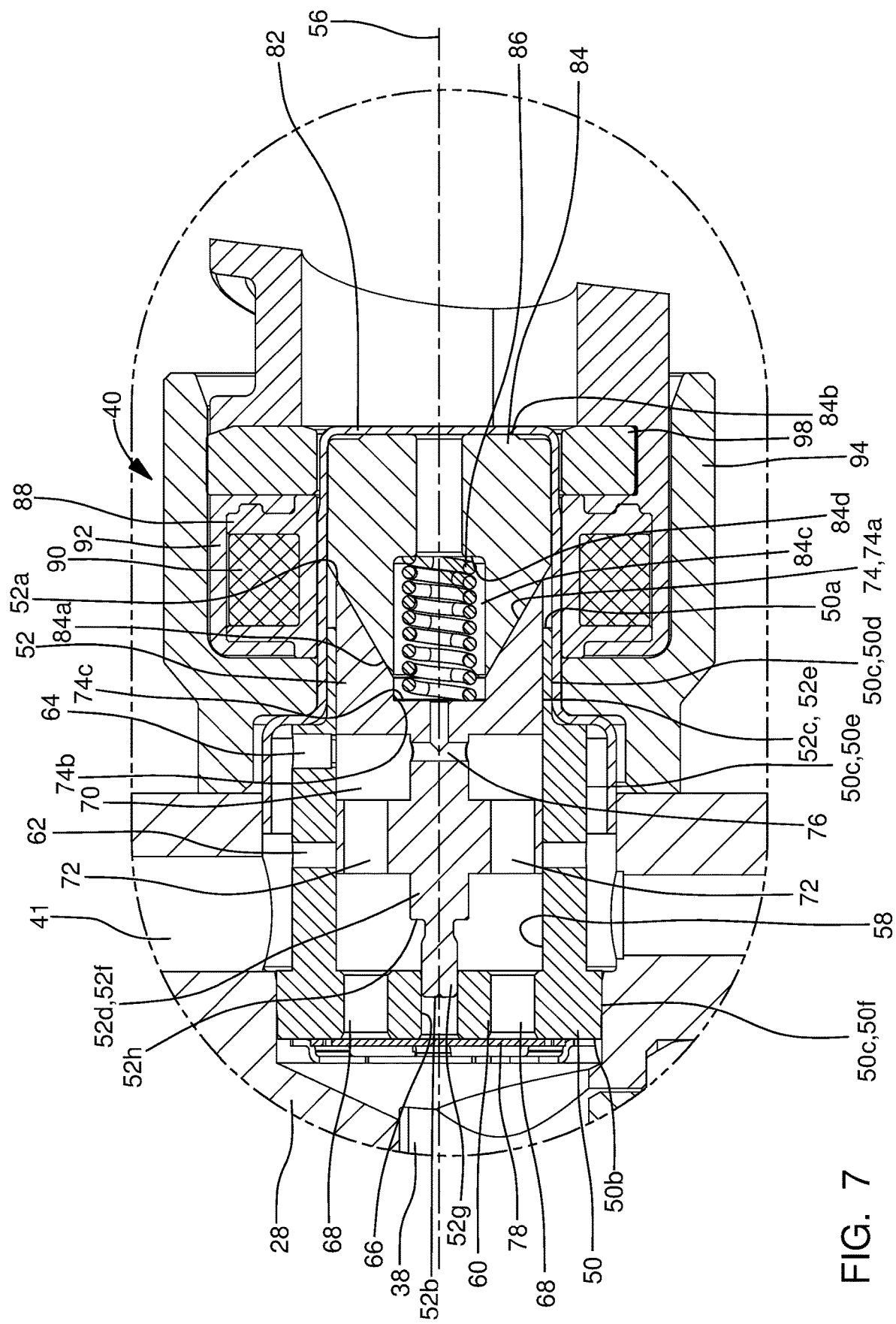
FIG. 7 is the view of FIGS. 4-6, now showing the inlet valve assembly in a fourth position.

Now with particular reference to FIG. 7, valve spool 52 is shown in a fourth position which results from electric current being supplied to coil 90 of solenoid assembly 55 at a third duty cycle which is greater than the second duty cycle used to achieve the third position of valve spool 52. When electric current is supplied to coil 90 at the third duty cycle, valve spool 52 is attracted to pole piece 84, thereby moving valve spool 52 toward pole piece 84 and compressing return spring 86 to a greater extent than in the third position. Just as in the second and third positions, the fourth position results in tip portion 52g being positioned to no longer protrude beyond valve body second end 50b, and consequently, check valve member 78 is moved to a seated position which prevents flow into valve body bore 58 through valve body outlet passages 68. However, it should be noted that check valve member 78 is able to move to the unseated position when the pressure differential between valve body bore 58 and pumping chamber 38 is sufficiently high, i.e. during the intake stroke. Also in the fourth position, just as in the third position, valve spool groove 70 is not aligned with valve body first inlet passage 62, however, valve spool groove 70 is now aligned with valve body second inlet passage 64, and in this way, fuel is allowed to valve body bore 58 through valve body second inlet passage 64. Consequently, during the intake stroke of pumping plunger 34, a pressure differential is created which allows fuel to flow through inlet valve assembly 40 through valve body second inlet passage 64, thereby moving check valve member 78 to the unseated position which allows fuel to flow into pumping chamber 38. During the compression stroke of pumping plunger 34, pressure increases within pumping chamber 38, thereby causing check valve member 78 to move to the seated position which prevents fuel from flowing from pumping chamber 38 into valve body bore 58 and which allows the pressurized fuel within pumping chamber 38 to be discharged through outlet valve 42. As should now be apparent, the third and fourth positions of valve spool 52 are nearly identical, however, the fourth position differs from the third position in that the alignment of valve spool groove 70 with valve body second inlet passage 64 is less restrictive than in the third position. Consequently, the fourth position of valve spool 52 is used when internal combustion engine 12 is required to produce a higher output torque since the alignment of valve spool groove 70 with valve body second inlet passage 64 provides a less restrictive passage which thereby meters a larger amount of fuel, compared to the third position, to pumping chamber 38 during the intake stroke of pumping plunger 34 to support fueling of internal combustion engine 12 at high loads.

As should now be clear, different duty cycles can be provided to vary the amount of fuel metered to pumping chamber 38 where the different duty cycles result in varying magnitudes of alignment of valve spool groove 70 with valve body second inlet passage 64, thereby varying the magnitude of restriction. In other words, the third and fourth positions as described above are only examples of positions of valve spool 52, and other duty cycles can be provided in order to provide different metered amounts of fuel to pumping chamber 38 in order to achieve different output torques of internal combustion engine 12. An electronic control unit 100 may be used to supply electric current to coil 90 at the various duty cycles described herein. Electronic control unit 100 may receive input from a pressure sensor 102 which senses the pressure within fuel rail 44 in order to provide a proper duty cycle to coil 90 in order to maintain a desired pressure in fuel rail 44 which may vary based on the commanded torque desired to be produced by internal combustion engine 12.

Figure 8:
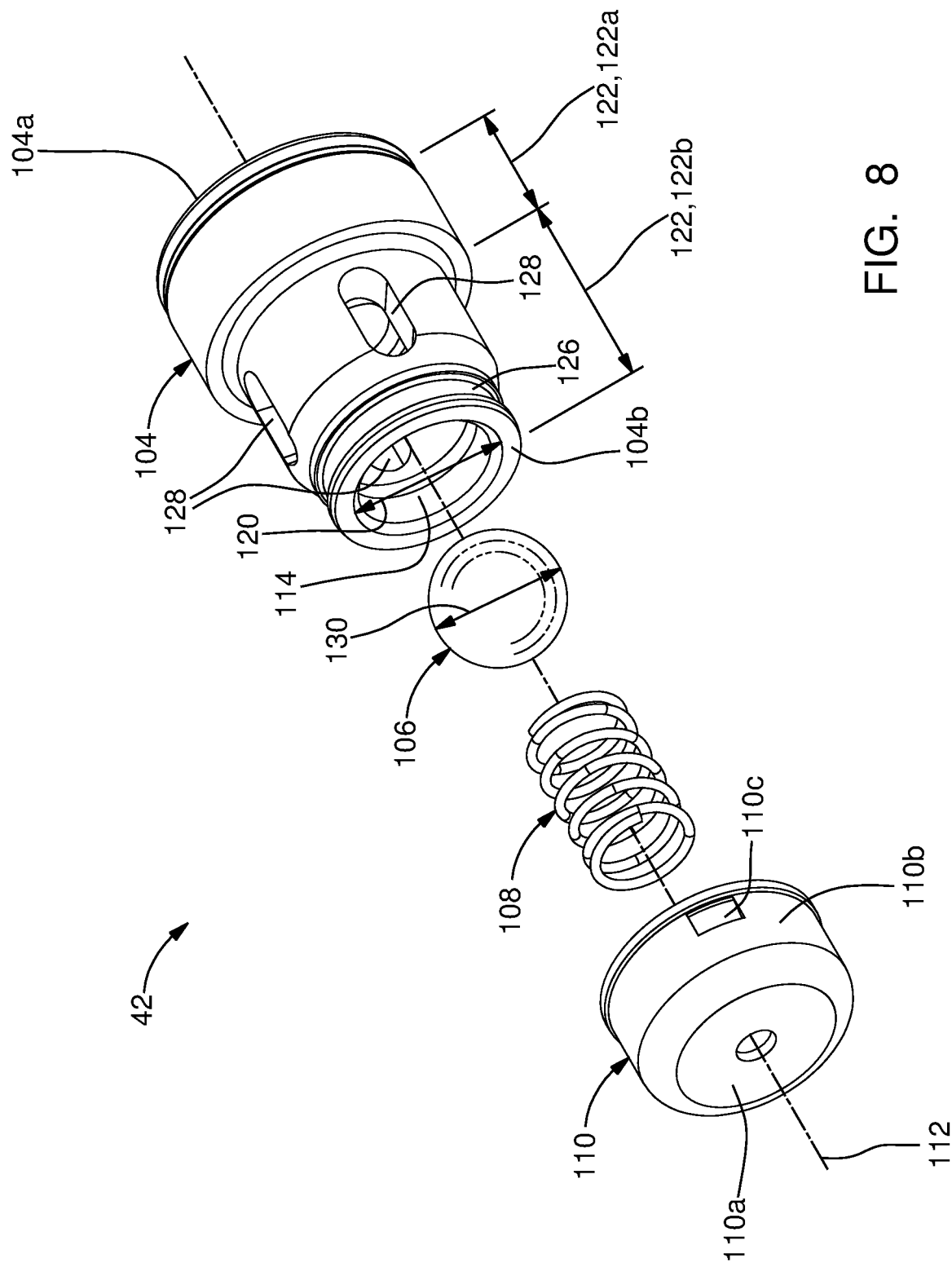
FIG. 8 is an isometric exploded view of an outlet valve of the fuel pump of FIGS. 1 and 2.
Figure 9:
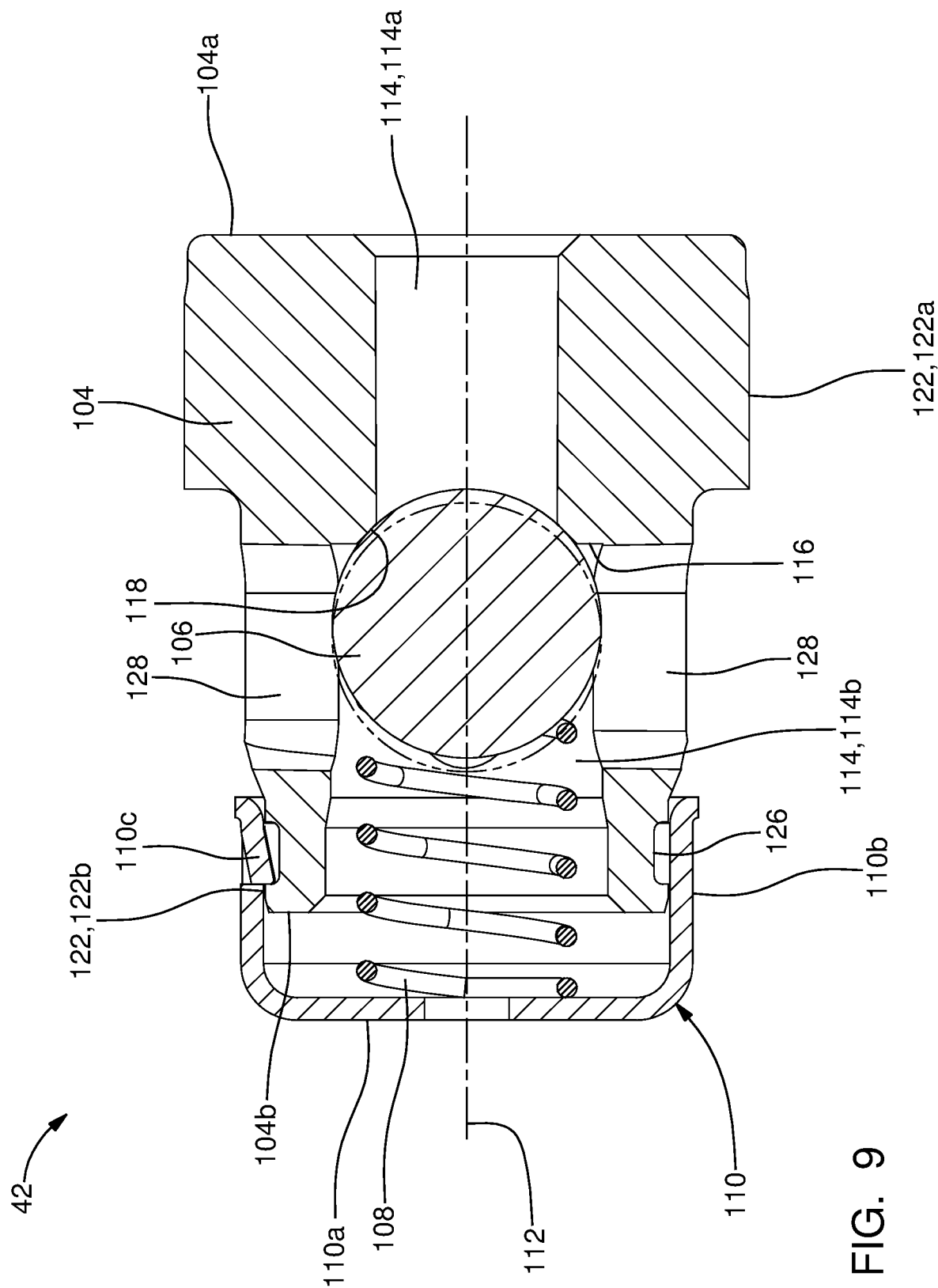
FIG. 9 is an axial cross-sectional view of the outlet valve of FIG. 8.
Figure 10:
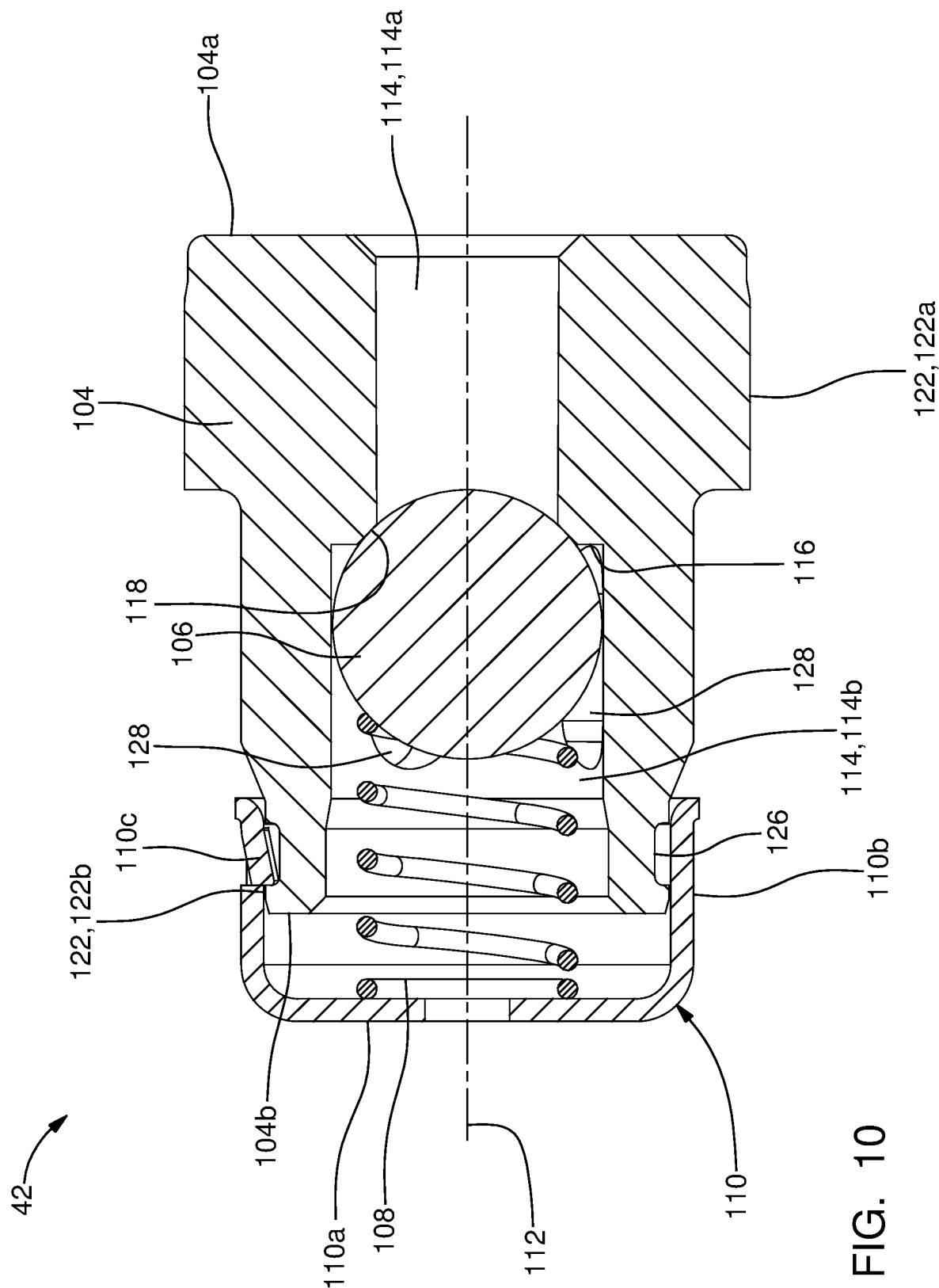
FIG. 10 is an axial cross-sectional view of the outlet valve of FIG. 8, taken in a different rotational position compared to FIG. 9.

Outlet valve 42 will now be described with particular reference to FIGS. 8-10. Outlet valve 42 includes an outlet valve housing 104, an outlet valve member 106, an outlet valve spring 108, and an outlet valve retainer 110. The various elements of outlet valve 42 will be described in greater detail in the paragraphs that follow.

Outlet valve housing 104 extends from an outlet valve housing first end 104a to an outlet valve housing second end 104b along an outlet valve axis 112. An outlet valve bore 114 extends through outlet valve housing 104 from outlet valve housing first end 104a to outlet valve housing second end 104b such that outlet valve bore 114 includes an outlet valve bore first portion 114a and an outlet valve bore second portion 114b where outlet valve bore first portion 114a and an outlet valve bore second portion 114b are each centered about, and extend along, outlet valve axis 112. Outlet valve bore first portion 114a extends from outlet valve housing first end 104a toward outlet valve housing second end 104b while outlet valve bore second portion 114b extends from outlet valve housing second end 104b to outlet valve bore first portion 114a such that outlet valve bore second portion 114b is larger in diameter than outlet valve bore first portion 114a, thereby creating a shoulder 116 which extends from outlet valve bore second portion 114b toward outlet valve axis 112. Outlet valve bore first portion 114a serves as an inlet to outlet valve 42 and is in constant fluid communication with pumping chamber 38. The end of outlet valve bore first portion 114a which is proximal to shoulder 116 includes an outlet valve seating surface 118 which may be, by way of non-limiting example only, a conical frustum or a spherical frustum (spherical segment) such that outlet valve member 106 seats with outlet valve seating surface 118 in a closed position of outlet valve member 106 which prevents fluid communication from outlet valve bore first portion 114a to outlet valve bore second portion 114b and such that outlet valve member 106 unseats with outlet valve seating surface 118 in an open position of outlet valve member 106 which permits fluid communication from outlet valve bore first portion 114a to outlet valve bore second portion 114b. It should be noted that the closed position of outlet valve member 106 is shown in solid lines in FIGS. 9 and 10 while the open position of outlet valve member 106 is shown in phantom lines in FIG. 9 only. Outlet valve bore second portion 114b opens at outlet valve housing second end 104b in an outlet valve bore second portion diameter 120 which is centered about, and is perpendicular to, outlet valve axis 112.

Outlet valve housing 104 has an outlet valve housing outer periphery 122 which surrounds, is centered about, and extends along outlet valve axis 112. Outlet valve housing outer periphery 122 includes an outlet valve housing outer periphery first portion 122a which extends from outlet valve housing first end 104a toward outlet valve housing second end 104b such that outlet valve housing outer periphery 122 is sized to sealingly engage a portion of outlet passage 43, thereby preventing fluid communication between the interface of outlet passage 43 and outlet valve housing outer periphery 122. Outlet valve housing outer periphery 122 also includes an outlet valve housing outer periphery second portion 122b which extends from outlet valve housing outer periphery first portion 122a to outlet valve housing second end 104b such that outlet valve housing outer periphery second portion 122b is sized to be smaller in diameter than outlet valve housing outer periphery first portion 122a which provides a flow path 124 radially between outlet passage 43 and outlet valve housing outer periphery second portion 122b. Outlet valve housing outer periphery second portion 122b includes an outlet valve housing retention groove 126 extending radially inward therefrom which is used to retain outlet valve retainer 110 to outlet valve housing 104 as will be described in greater detail later and which is annular in shape and centered about outlet valve axis 112. Outlet valve housing outer periphery first portion 122a circumferentially surrounds a portion of outlet valve bore first portion 114a while outlet valve housing outer periphery second portion 122b circumferentially surrounds outlet valve bore second portion 114b and a portion of outlet valve bore first portion 114a.

Outlet valve housing 104 includes one or more outlet apertures 128 which each extend radially outward from outlet valve bore second portion 114b to outlet valve housing outer periphery second portion 122b. As illustrated herein, four outlet apertures 128 may be provided which are equally circumferentially spaced around outlet valve housing outer periphery 122, however, outlet apertures 128 may alternatively be unequally spaced and/or provided in greater or lesser quantities. It is important to note that outlet apertures 128 extend to shoulder 116 such that outlet apertures 128 intersect with shoulder 116.

Outlet valve member 106 may be, by way of non-limiting example only as illustrated herein, a spherical ball which is sized to move within outlet valve bore second portion 114b along outlet valve axis 112. While outlet valve bore second portion 114b may be stepped, i.e. having portions of differing diameters, the portion of outlet valve bore second portion 114b within which outlet valve member 106 moves during operation, i.e. between the open position and the closed position of outlet valve member 106, is sized to guide outlet valve member 106 during movement of outlet valve member 106 between the open position and the closed position. Outlet valve member 106 has a maximum valve member diameter 130 perpendicular to outlet valve axis 112 which is less than outlet valve bore second portion diameter 120, thereby allowing outlet valve member 106 to be inserted into outlet valve bore 114 from outlet valve housing second end 104b, i.e. outlet valve bore second portion 114b is greater in diameter than maximum valve member diameter 130 to allow outlet valve member 106 to be inserted in outlet valve bore second portion 114b through outlet valve housing second end 104b and move into the closed position of outlet valve member 106. Since outlet valve member 106 has been illustrated herein as a spherical ball, maximum valve member diameter 130 is simply the diameter of outlet valve member 106. However, outlet valve member 106 may alternatively take other forms and maximum valve member diameter 130 is the maximum diameter thereof taken perpendicular to outlet valve axis 112.

Outlet valve retainer 110 is a cup-shaped element with an outlet retainer end wall 110a which traverses outlet valve bore second portion 114b, i.e. 110a is axially aligned with outlet valve bore second portion 114b but axially offset therefrom. Outlet valve retainer 110 also includes an outlet valve retainer sidewall 110b which extends from outlet retainer end wall 110a toward outlet valve housing first end 104a. Outlet valve retainer sidewall 110b is annular in shape such that that outlet valve retainer sidewall 110b circumferentially surrounds a portion of outlet valve housing outer periphery second portion 122b and in particular, circumferentially surrounds outlet valve housing retention groove 126. In order to retain outlet valve retainer 110 to outlet valve housing 104, outlet valve retainer 110 includes a plurality of retention fingers 110c in which one end of each retention finger 110c extends from outlet valve retainer sidewall 110b and in which a free end of each retention finger 110c extends into outlet valve housing retention groove 126. The free end of each retention finger 110c is oriented to engage outlet valve housing retention groove 126 to prevent removal of outlet valve retainer 110 from outlet valve housing 104, i.e. movement of outlet valve retainer 110 toward the left as viewed in FIG. 9. Since each retention finger 110c is resilient and compliant, each retention finger 110c is resiliently deflected radially outward as outlet valve retainer 110 is installed onto outlet valve housing 104, i.e. movement of outlet valve retainer 110 toward the left as viewed in FIG. 9, and then each retention finger 110c snaps into outlet valve housing retention groove 126 when the tip of each retention finger 110c is radially aligned with outlet valve housing retention groove 126. In addition to or in the alternative, outlet valve retainer 110 may be retained by interference fit of the inner periphery thereof with outlet valve retainer 110, welding, adhesives, and the like.

Outlet valve spring 108 is preferably a compression coil spring and is positioned axially between outlet valve member 106 and outlet valve retainer 110 such that one end of outlet valve spring 108 engages outlet valve member 106 while the other end of outlet valve spring 108 engages outlet retainer end wall 110a, thereby causing outlet valve retainer 110 to ground outlet valve spring 108 to outlet valve housing 104. Outlet valve spring 108 is held in compression between outlet valve member 106 and outlet valve retainer 110, thereby biasing outlet valve member 106 toward outlet valve seating surface 118. The spring rate of outlet valve spring 108 is selected to allow outlet valve member 106 to move to the open position when the pressure within pumping chamber 38 has reached a desired value. A practitioner of ordinary skill in the art would be able to select the proper spring rate given the desired pressure that outlet valve member 106 is desired to move to the open position.

In operation, when the pressure within pumping chamber 38 is sufficiently high, the fuel within outlet valve bore first portion 114a urges outlet valve member 106 to move to the open position, thereby unseating outlet valve member 106 from outlet valve seating surface 118 and further compressing outlet valve spring 108. As a result, fuel is allowed to flow from outlet valve bore first portion 114a to outlet valve bore second portion 114b and exit outlet valve bore second portion 114b through outlet apertures 128 and subsequently pass to fuel rail 44 and fuel injectors 16. It should be noted that since outlet apertures 128 intersect with shoulder 116, less turbulence is introduced to the fuel as it passes out of outlet valve 42, thereby minimizing noise and restriction. Conversely, when the pressure within pumping chamber 38 falls sufficiently, outlet valve spring 108 moves outlet valve member 106 to the closed position where outlet valve member 106 seats with outlet valve seating surface 118. It should be noted that both when outlet valve member 106 is moving to the open position and when outlet valve member 106 is moving to the closed position, outlet valve member 106 is guided by outlet valve bore second portion 114b. In other words, the extent to which outlet valve member 106 is able to move perpendicular to outlet valve axis 112 is limited by outlet valve bore second portion 114b, i.e. by a surface of outlet valve bore second portion 114b. Furthermore, since outlet valve bore second portion 114b and outlet valve seating surface 118 are formed of a continuous piece of material, i.e. outlet valve housing 104, the concentricity of outlet valve bore second portion 114b and outlet valve seating surface 118 can be tightly controlled, thereby allowing the clearance between outlet valve member 106 and outlet valve bore second portion 114b to be made desirably small. Preferably, the diametric clearance between outlet valve member 106 and outlet valve bore second portion 114b is between 25 microns and 200 microns, even more preferably between 25 microns and 100 microns, and still even more preferably between 25 microns and 50 microns. This range of diametric clearance reduces noise produced by outlet valve 42 during operation by minimizing lateral movement of outlet valve member 106 and also increases durability due to ensuring that outlet valve member 106 is more closely aligned with outlet valve seating surface 118 when outlet valve member 106 moves to the closed position.

Figure 11:
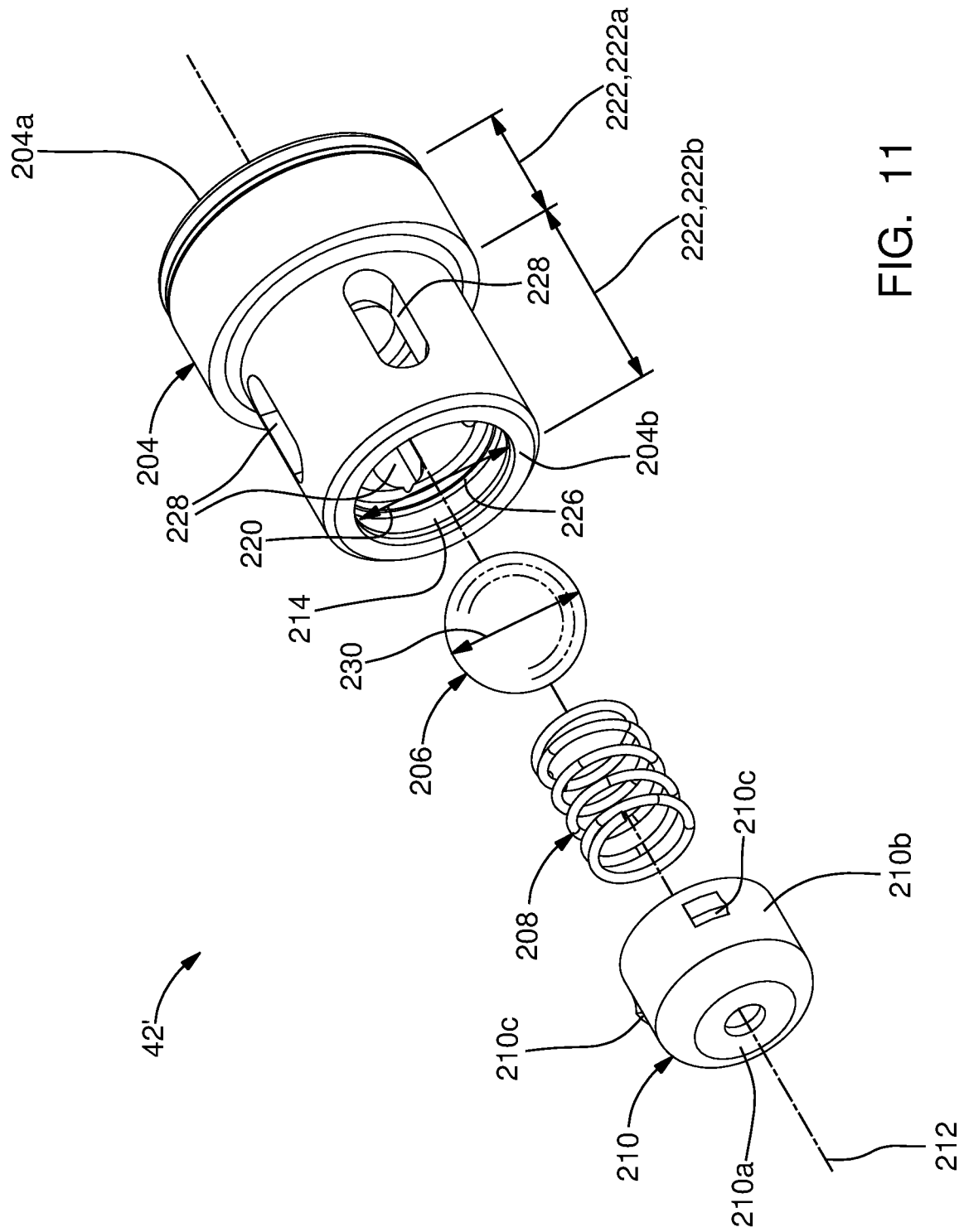
FIG. 11 is an isometric exploded view of an alternative outlet valve.
Figure 12:
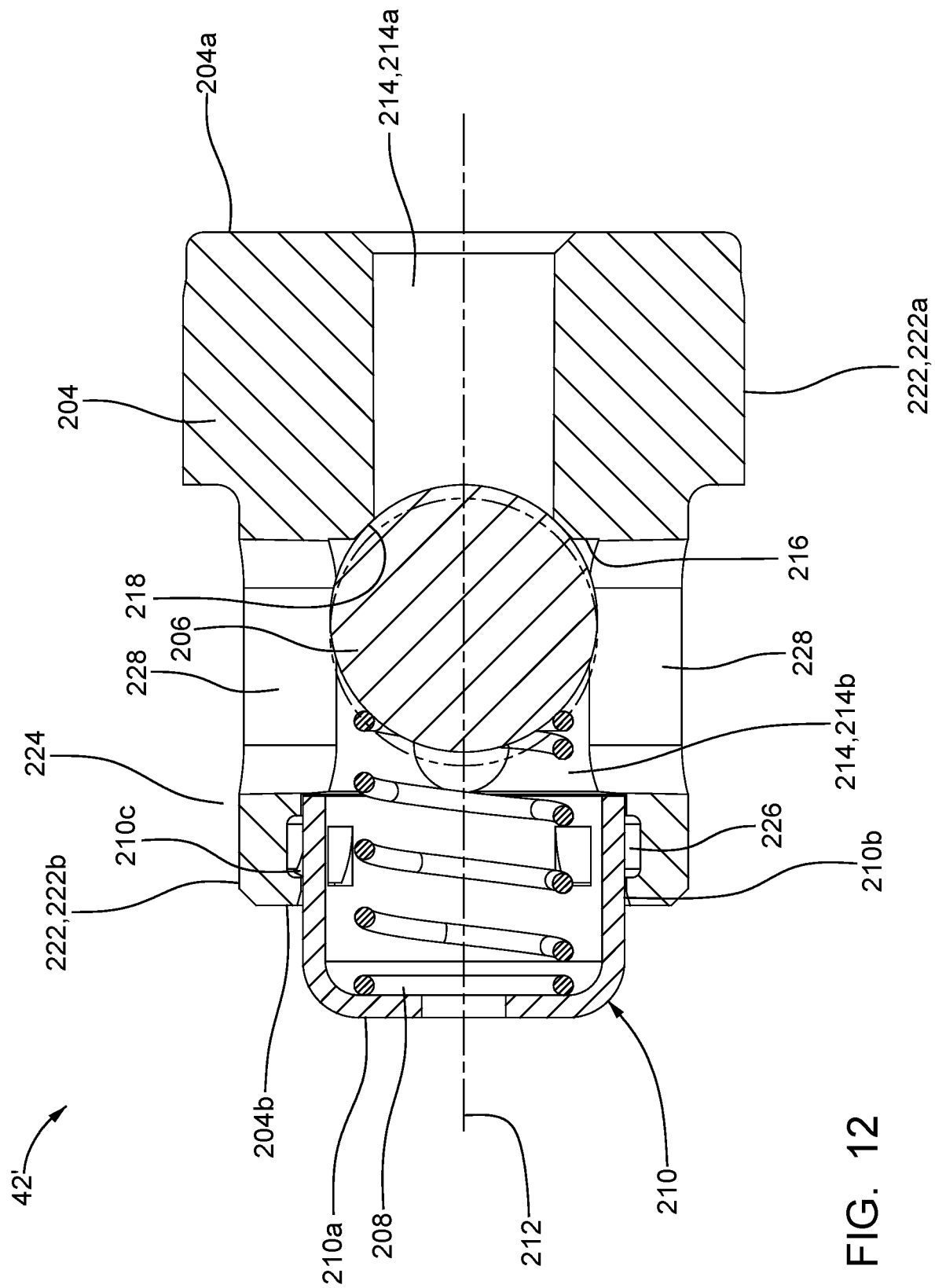
FIG. 12 is an axial cross-sectional view of the outlet valve of FIG. 11.
Figure 13:
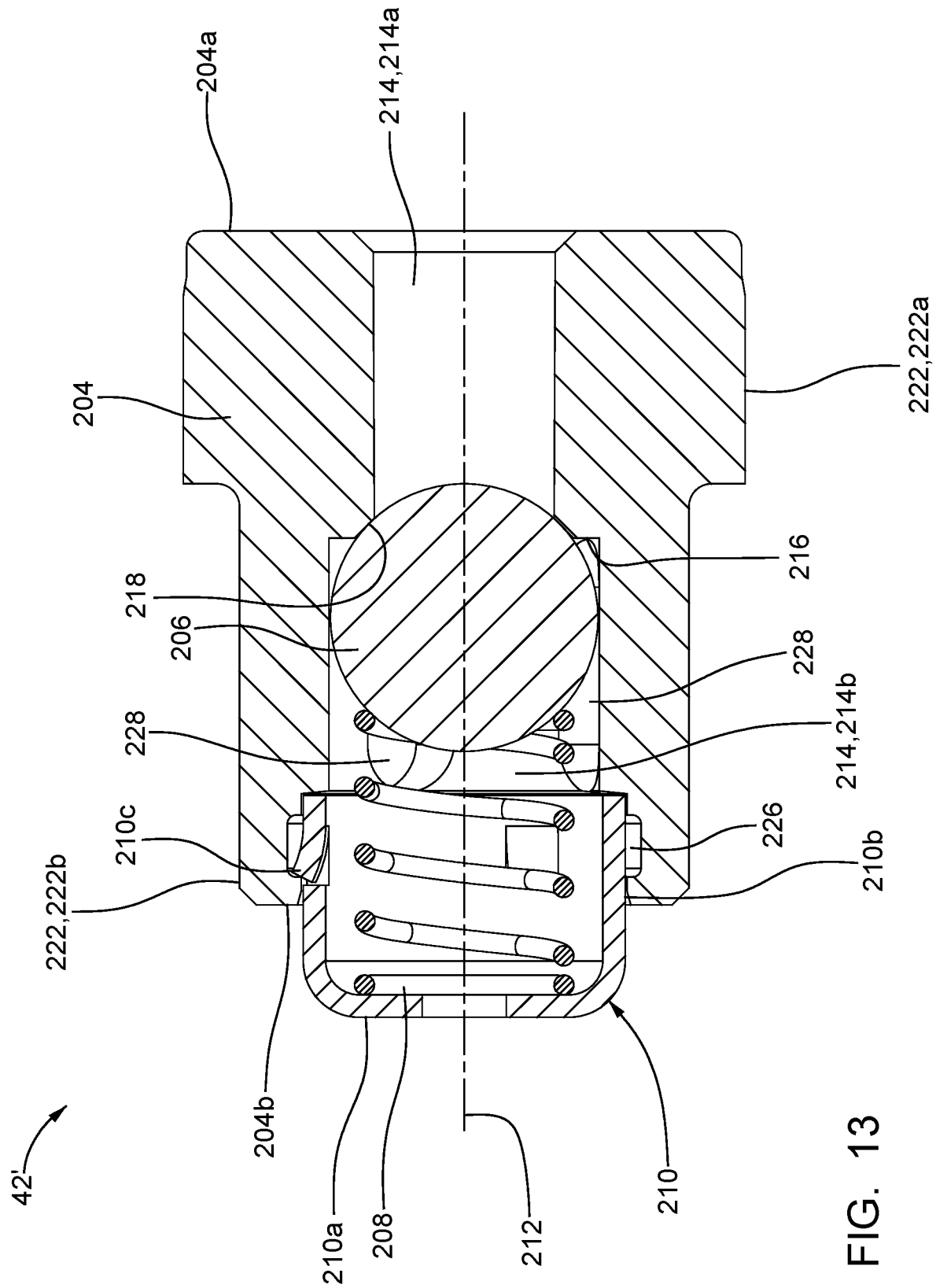
FIG. 13 is an axial cross-sectional view of the outlet valve of FIG. 11, taken in a different rotational position compared to FIG. 12.
Figure 14:
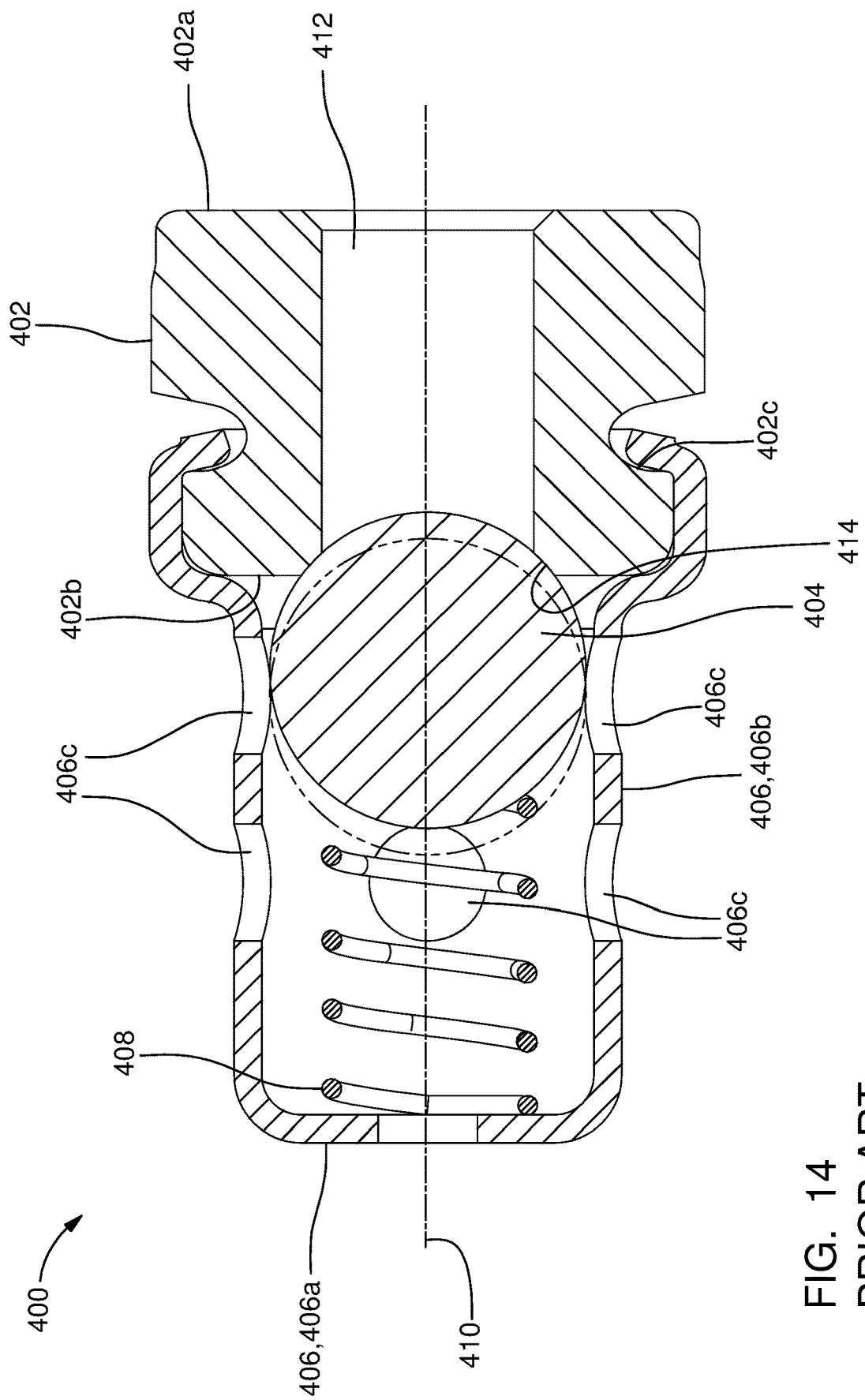
FIG. 14 is an axial cross-sectional view of a prior art outlet valve.

An alternative outlet valve 42' will now be described with reference to FIGS. 11-13 where the overall function of outlet valve 42' is the same as outlet valve 42. Outlet valve 42' includes an outlet valve housing 204, an outlet valve member 206, an outlet valve spring 208, and an outlet valve retainer 210. The various elements of outlet valve 42' will be described in greater detail in the paragraphs that follow.

Outlet valve housing 204 extends from an outlet valve housing first end 204a to an outlet valve housing second end 204b along an outlet valve axis 212. An outlet valve bore 214 extends through outlet valve housing 204 from outlet valve housing first end 204a to outlet valve housing second end 204b such that outlet valve bore 214 includes an outlet valve bore first portion 214a and an outlet valve bore second portion 214b and such that outlet valve bore 214 is centered about, and extends along outlet valve axis 212. Outlet valve bore first portion 214a extends from outlet valve housing first end 204a toward outlet valve housing second end 204b while outlet valve bore second portion 214b extends from outlet valve housing second end 204b to outlet valve bore first portion 214a such that outlet valve bore second portion 214b is larger in diameter than outlet valve bore first portion 214a, thereby creating a shoulder 216 which extends from outlet valve bore second portion 214b toward outlet valve axis 212. Outlet valve bore first portion 214a serves as an inlet to outlet valve 42' and is in constant fluid communication with pumping chamber 38 when installed in high-pressure fuel pump 20 as outlet valve 42 has been illustrated. The end of outlet valve bore first portion 214a which is proximal to shoulder 216 includes an outlet valve seating surface 218 which may be, by way of non-limiting example only, a conical frustum or a spherical frustum (spherical segment) such that outlet valve member 206 seats with outlet valve seating surface 218 in a closed position of outlet valve member 206 which prevents fluid communication from outlet valve bore first portion 214a to outlet valve bore second portion 214b and such that outlet valve member 206 unseats with outlet valve seating surface 218 in an open position of outlet valve member 206 which permits fluid communication from outlet valve bore first portion 214a to outlet valve bore second portion 214b. It should be noted that the closed position of outlet valve member 206 is shown in solid lines in FIGS. 12 and 13 while the open position of outlet valve member 206 is shown in phantom lines in FIG. 12 only. Outlet valve bore second portion 214b opens at outlet valve housing second end 204b in an outlet valve bore second portion diameter 220 which is centered about, and is perpendicular to, outlet valve axis 212. Outlet valve bore second portion 214b includes an outlet valve housing retention groove 226 which is used to retain outlet valve retainer 210 to outlet valve housing 204 as will be described in greater detail later and which is annular in shape, extends radially outward from outlet valve bore second portion 214b, and centered about outlet valve axis 212.

Outlet valve housing 204 has an outlet valve housing outer periphery 222 which surrounds, is centered about, and extends along outlet valve axis 212. Outlet valve housing outer periphery 222 includes an outlet valve housing outer periphery first portion 222a which extends from outlet valve housing first end 204a toward outlet valve housing second end 204b such that outlet valve housing outer periphery 222 is sized to sealingly engage a portion of outlet passage 43, thereby preventing fluid communication between the interface of outlet passage 43 and outlet valve housing outer periphery 222. Outlet valve housing outer periphery 222 also includes an outlet valve housing outer periphery second portion 222b which extends from outlet valve housing outer periphery first portion 222a to outlet valve housing second end 204b such that outlet valve housing outer periphery second portion 222b is sized to be smaller in diameter than outlet valve housing outer periphery first portion 222a which provides a flow path 224 radially between outlet passage 43 and outlet valve housing outer periphery second portion 222b. Outlet valve housing outer periphery first portion 222a circumferentially surrounds a portion of outlet valve bore first portion 214a while outlet valve housing outer periphery second portion 222b circumferentially surrounds outlet valve bore second portion 214b and a portion of outlet valve bore first portion 214a.

Outlet valve housing 204 includes one or more outlet apertures 228 which each extend radially outward from outlet valve bore second portion 214b to outlet valve housing outer periphery second portion 222b. As illustrated herein, four outlet apertures 228 may be provided which are equally circumferentially spaced around outlet valve housing outer periphery 222, however, outlet apertures 228 may alternatively be unequally spaced and/or provided in greater or lesser quantities. It is important to note that outlet apertures 228 extend to shoulder 216 such that outlet apertures 228 intersect with shoulder 216.

Outlet valve member 206 may be, by way of non-limiting example only as illustrated herein, a spherical ball which is sized to move within outlet valve bore second portion 214b along outlet valve axis 212. While outlet valve bore second portion 214b may be stepped, i.e. having portions of differing diameters, the portion of outlet valve bore second portion 214b within which outlet valve member 206 moves during operation, i.e. between the open position and the closed position of outlet valve member 206, is sized to guide outlet valve member 206 during movement of outlet valve member 206 between the open position and the closed position. Outlet valve member 206 has a maximum valve member diameter 230 perpendicular to outlet valve axis 212 which is less than outlet valve bore second portion diameter 220, thereby allowing outlet valve member 206 to be inserted into outlet valve bore 214 from outlet valve housing second end 204b, i.e. outlet valve bore second portion 214b is greater in diameter than maximum valve member diameter 230 to allow outlet valve member 206 to be inserted in outlet valve bore second portion 214b through outlet valve housing second end 204b and move into the closed position of outlet valve member 206. Since outlet valve member 206 has been illustrated herein as a spherical ball, maximum valve member diameter 230 is simply the diameter of outlet valve member 206. However, outlet valve member 206 may alternatively take other forms and maximum valve member diameter 230 is the maximum diameter thereof taken perpendicular to outlet valve axis 212.

Outlet valve retainer 210 is a cup-shaped element with an outlet retainer end wall 210a which traverses outlet valve bore second portion 214b, i.e. 210a is axially aligned with outlet valve bore second portion 214b but axially offset therefrom. Outlet valve retainer 210 also includes an outlet valve retainer sidewall 210b which extends from outlet retainer end wall 210a toward outlet valve housing first end 204a. Outlet valve retainer sidewall 210b is annular in shape such that that outlet valve retainer sidewall 210b extends into, and is circumferentially surrounded by, a portion of outlet valve bore second portion 214b and in particular, is circumferentially surrounded by outlet valve housing retention groove 226. In order to retain outlet valve retainer 210 to outlet valve housing 204, outlet valve retainer 210 includes a plurality of retention fingers 210c in which one end of each retention finger 210c extends outward from outlet valve retainer sidewall 210b and in which a free end of each retention finger 210c extends into outlet valve housing retention groove 226. The free end of each retention finger 210c is oriented to engage outlet valve housing retention groove 226 to prevent removal of outlet valve retainer 210 from outlet valve housing 204, i.e. movement of outlet valve retainer 210 toward the left as viewed in FIG. 12. Since each retention finger 210c is resilient and compliant, each retention finger 210c is resiliently deflected radially inward as outlet valve retainer 210 is installed onto outlet valve housing 204, i.e. movement of outlet valve retainer 210 toward the left as viewed in FIG. 12, and then each retention finger 210c snaps into outlet valve housing retention groove 226 when the tip of each retention finger 110c is radially aligned with outlet valve housing retention groove 126. In addition to or in the alternative, outlet valve retainer 210 may be retained by interference fit of the outer periphery thereof with outlet valve housing 204, welding, adhesives, and the like.

Outlet valve spring 208 is preferably a compression coil spring and is positioned axially between outlet valve member 206 and outlet valve retainer 210 such that one end of outlet valve spring 208 engages outlet valve member 206 while the other end of outlet valve spring 208 engages outlet retainer end wall 210a, thereby causing outlet valve retainer 210 to ground outlet valve spring 208 to outlet valve housing 204. Outlet valve spring 208 is held in compression between outlet valve member 206 and outlet valve retainer 210, thereby biasing outlet valve member 206 toward outlet valve seating surface 218. The spring rate of outlet valve spring 208 is selected to allow outlet valve member 206 to move to the open position when the pressure within pumping chamber 38 has reached a desired value. A practitioner of ordinary skill in the art would be able to select the proper spring rate given the desired pressure that outlet valve member 206 is desired to move to the open position.

In operation, when the pressure within pumping chamber 38 is sufficiently high, the fuel within outlet valve bore first portion 214a urges outlet valve member 206 to move to the open position, thereby unseating outlet valve member 206 from outlet valve seating surface 218 and further compressing outlet valve spring 208. As a result, fuel is allowed to flow from outlet valve bore first portion 214a to outlet valve bore second portion 214b and exit outlet valve bore second portion 214b through outlet apertures 228 and subsequently pass to fuel rail 44 and fuel injectors 16. It should be noted that since outlet apertures 228 intersect with shoulder 216, less turbulence is introduced to the fuel as it passes out of outlet valve 42', thereby minimizing noise and restriction. Conversely, when the pressure within pumping chamber 38 falls sufficiently, outlet valve spring 208 moves outlet valve member 206 to the closed position where outlet valve member 206 seats with outlet valve seating surface 218. It should be noted that both when outlet valve member 206 is moving to the open position and when outlet valve member 206 is moving to the closed position, outlet valve member 206 is guided by outlet valve bore second portion 214b, i.e. by a surface of outlet valve bore second portion 214b. In other words, the extent to which outlet valve member 206 is able to move perpendicular to outlet valve axis 212 is limited by outlet valve bore second portion 214b. Furthermore, since outlet valve bore second portion 214b and outlet valve seating surface 218 are formed of a continuous piece of material, i.e. outlet valve housing 204, the concentricity of outlet valve bore second portion 214b and outlet valve seating surface 218 can be tightly controlled, thereby allowing the clearance between outlet valve member 206 and outlet valve bore second portion 214b to be made desirably small. Preferably, the diametric clearance between outlet valve member 206 and outlet valve bore second portion 214b is between 25 microns and 200 microns, even more preferably between 25 microns and 100 microns, and still even more preferably between 25 microns and 50 microns. This range of diametric clearance reduces noise produced by outlet valve 42' during operation by minimizing lateral movement of outlet valve member 206 and also increases durability due to ensuring that outlet valve member 206 is more closely aligned with outlet valve seating surface 218 when outlet valve member 206 moves to the closed position.

While high-pressure fuel pump 20 has been illustrated in the figures as including pressure pulsation dampers upstream of pump housing inlet passage 41, although not described herein, it should be understood that the pressure pulsation dampers may be omitted as a result of employing inlet valve assembly 40 which is a proportional valve. Furthermore, while check valve member 78 has been illustrated herein as a flat plate, it should be understood that check valve member 78 may alternatively be a ball biased by a spring which opens and closes a single valve body outlet passage 68.

While this invention has been described in terms of preferred embodiments thereof, it is not intended to be so limited, but rather only to the extent set forth in the claims that follow.

I claim:
1. An outlet valve for controlling outlet fuel flow of a fuel pump, said outlet valve comprising:
   an outlet valve housing extending from a first end to a second end along an outlet valve axis, said outlet valve housing having an outlet valve bore having an outlet valve bore first portion which extends toward said second end and said outlet valve bore also having an outlet valve bore second portion which extends from said second end to said outlet valve bore first portion such that an outlet valve seating surface is located within said outlet valve bore;
   an outlet valve member which moves within said outlet valve bore second portion between 1) a closed position in which said outlet valve member is seated with said outlet valve seating surface which prevents fluid communication from said outlet valve bore first portion to said outlet valve bore second portion and 2) an open position in which said outlet valve member is unseated with said outlet valve seating surface which permits fluid communication from said outlet valve bore first portion to said outlet valve bore second portion, wherein a surface of said outlet valve bore second portion guides said outlet valve member during movement between said closed position and said open position and wherein said surface of said outlet valve bore second portion and said outlet valve seating surface are provided on a continuous piece of material of said outlet valve housing;
   an outlet valve spring which biases said outlet valve member toward said closed position; and
   a retainer fixed to said outlet valve housing which grounds said outlet valve spring to said outlet valve housing;
   wherein said outlet valve housing includes an outlet aperture which extends radially outward from said outlet valve bore second portion to an outer peripheral surface of said outlet valve housing;
   wherein said outlet valve bore second portion terminates within said outlet valve housing at a shoulder which extends toward said outlet valve axis;

wherein said outlet aperture intersects with said shoulder; and wherein said shoulder is a flat surface perpendicular to said outlet valve axis.

2. An outlet valve as in claim 1, wherein said outlet valve seating surface connects said outlet valve bore first portion to said shoulder.

3. An outlet valve as in claim 1, wherein:
said outlet valve housing includes a retention groove; and
said retainer includes a retainer end wall which traverses said outlet valve bore second portion and also includes a retainer sidewall which extends from said retainer end wall toward said first end of said outlet valve housing, said retainer sidewall having a plurality retention fingers which are resilient and compliant and which extend into said retention groove, thereby constraining said retainer on said outlet valve housing along said outlet valve axis in a direction away from said first end of said outlet valve housing.

4. An outlet valve as in claim 3, wherein said retention groove is annular.

5. An outlet valve as in claim 4, wherein said retention groove is located on an outer peripheral surface of said outlet valve housing and said retainer sidewall circumferentially surrounds said outer peripheral surface of said outlet valve housing.

6. An outlet valve as in claim 3, wherein said retention groove extends radially outward from said outlet valve bore second portion and said retainer sidewall is located within said outlet valve bore second portion.

7. An outlet valve as in claim 1, wherein:
said outlet valve bore extends through said outlet valve housing from said first end to said second end;
said outlet valve bore first portion extends from said first end toward said second end; and
said outlet valve bore first portion is an inlet to said outlet valve housing.

8. An outlet valve as in claim 1, wherein:
said outlet valve bore second portion opens at said second end in an outlet valve bore second portion diameter which is centered about, and is perpendicular to, said outlet valve axis; and
said outlet valve member has a maximum valve member diameter perpendicular to said outlet valve axis which is less than said outlet valve bore second portion diameter.

9. A fuel pump comprising:
a fuel pump housing with a pumping chamber defined therein;
a pumping plunger which reciprocates within a plunger bore along a plunger bore axis such that an intake stroke of said pumping plunger increases volume of said pumping chamber and a compression stroke of said pumping plunger decreases volume of said pumping chamber; and
an outlet valve comprising:
an outlet valve housing extending from a first end to a second end along an outlet valve axis, said outlet valve housing having an outlet valve bore having an outlet valve bore first portion which extends toward said second end which is an inlet to said outlet valve from said pumping chamber such that said outlet valve bore first portion is in constant fluid communication with said pumping chamber and said outlet valve bore also having an outlet valve bore second portion which extends from said second end to said outlet valve bore first portion such that an outlet valve seating surface is located within said outlet valve bore;
an outlet valve member which moves within said outlet valve bore second portion between 1) a closed position in which said outlet valve member is seated with said outlet valve seating surface which prevents fluid communication from said outlet valve bore first portion to said outlet valve bore second portion and 2) an open position in which said outlet valve member is unseated with said outlet valve seating surface which permits fluid communication from said outlet valve bore first portion to said outlet valve bore second portion, wherein a surface of said outlet valve bore second portion guides said outlet valve member during movement between said closed position and said open position and wherein said surface of said outlet valve bore second portion and said outlet valve seating surface are provided on a continuous piece of material of said outlet valve housing;
an outlet valve spring which biases said outlet valve member toward said closed position; and
a retainer fixed to said outlet valve housing which grounds said outlet valve spring to said outlet valve housing;
wherein said outlet valve housing includes an outlet aperture which extends radially outward from said outlet valve bore second portion to an outer peripheral surface of said outlet valve housing;
wherein said outlet valve bore second portion terminates within said outlet valve housing at a shoulder which extends toward said outlet valve axis;
wherein said outlet aperture intersects with said shoulder; and
wherein said shoulder is a flat surface perpendicular to said outlet valve axis.

10. A fuel pump as in claim 9, wherein said outlet valve seating surface connects said outlet valve bore first portion to said shoulder.

11. A fuel pump as in claim 9, wherein:
said outlet valve housing includes a retention groove; and
said retainer includes a retainer end wall which traverses said outlet valve bore second portion and also includes a retainer sidewall which extends from said retainer end wall toward said first end of said outlet valve housing, said retainer sidewall having a plurality retention fingers which are resilient and compliant and which extend into said retention groove, thereby constraining said retainer on said outlet valve housing along said outlet valve axis in a direction away from said first end of said outlet valve housing.

12. A fuel pump as in claim 11, wherein said retention groove is annular.

13. A fuel pump as in claim 12, wherein said retention groove is located on an outer peripheral surface of said outlet valve housing and said retainer sidewall circumferentially surrounds said outer peripheral surface of said outlet valve housing.

14. A fuel pump as in claim 11, wherein said retention groove extends radially outward from said outlet valve bore second portion and said retainer sidewall is located within said outlet valve bore second portion.

15. A fuel pump as in claim 9, wherein:
said outlet valve bore extends through said outlet valve housing from said first end to said second end;

said outlet valve bore first portion extends from said first end toward said second end; and said outlet valve bore first portion is an inlet to said outlet valve housing.

16. A fuel pump as in claim 9, wherein:

said outlet valve bore second portion opens at said second end in an outlet valve bore second portion diameter which is centered about, and is perpendicular to, said outlet valve axis; and said outlet valve member has a maximum valve member diameter perpendicular to said outlet valve axis which is less than said outlet valve bore second portion diameter.

\* \* \* \* \*